United States Patent
Yamamoto et al.

[11] Patent Number: 6,134,022
[45] Date of Patent: *Oct. 17, 2000

[54] COLOR IMAGE PRINTING SYSTEM CAPABLE OF CORRECTING DENSITY DEVIATION ON IMAGE AND SYSTEM FOR DETECTING COLOR DEVIATION ON IMAGE

[75] Inventors: Naofumi Yamamoto, Tokyo-to; Hidekazu Sekizawa, Yokohama, both of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,216

[22] Filed: Jul. 12, 1996

[30] Foreign Application Priority Data

Jul. 14, 1995 [JP] Japan ................................. 7-178991
Jul. 31, 1995 [JP] Japan ................................. 7-195258

[51] Int. Cl.$^7$ ........................................ G06F 15/00
[52] U.S. Cl. ....................... 358/1.9; 358/1.2; 347/235; 347/250
[58] Field of Search .................................. 395/109, 102; 358/296, 424, 520, 515, 518, 519; 347/116, 234, 235, 240, 243, 250, 259, 14; 399/32, 38, 46, 49

[56] References Cited

U.S. PATENT DOCUMENTS

| | | | |
|---|---|---|---|
| 4,912,491 | 3/1990 | Hoshino et al. | 346/160 |
| 5,444,468 | 8/1995 | Fukushima et al. | 347/14 |
| 5,576,811 | 11/1996 | Kobayashi et al. | 355/246 |
| 5,926,579 | 7/1999 | Uejo et al. | 358/466 |
| 5,956,052 | 9/1999 | Udagawa et al. | 347/14 |

FOREIGN PATENT DOCUMENTS

| | | |
|---|---|---|
| 0 050 010 | 4/1982 | European Pat. Off. . |
| 0 342 640 | 11/1989 | European Pat. Off. . |
| 0 575 162 | 12/1993 | European Pat. Off. . |
| 4-317247 | 11/1992 | Japan . |
| 4-326380 | 11/1992 | Japan . |
| 91/15919 | 10/1991 | WIPO . |

*Primary Examiner*—Edward L. Coles
*Assistant Examiner*—Mark Wallerson
*Attorney, Agent, or Firm*—Foley & Lardner

[57] ABSTRACT

An image recording system for deriving a recorded image from an image signal by producing a positional-deviation amount indicative signal representative of a positional deviation in a sub-scanning direction of a scanning line forming a recorded image. The system corrects the positional deviation of the scanning line on the basis of the positional-deviation amount indicative signal. The system also corrects a density deviation of a recorded image due to the correction of the positional deviation on the basis of a pixel pattern of the image signal. A method is also provided for detecting a relative positional deviation between images of different colors in a color image recording system.

8 Claims, 20 Drawing Sheets

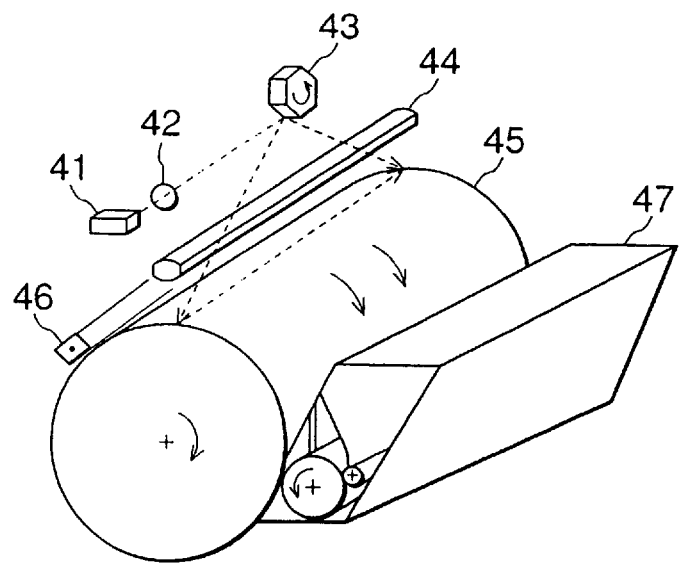
FIG.4
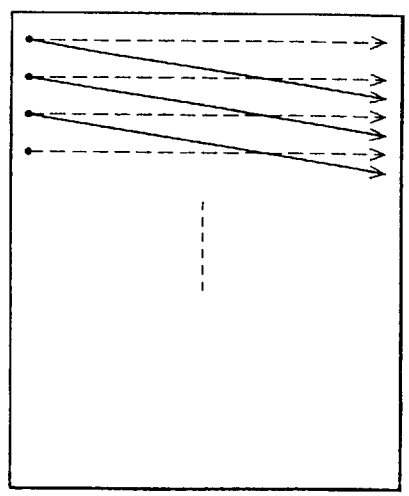 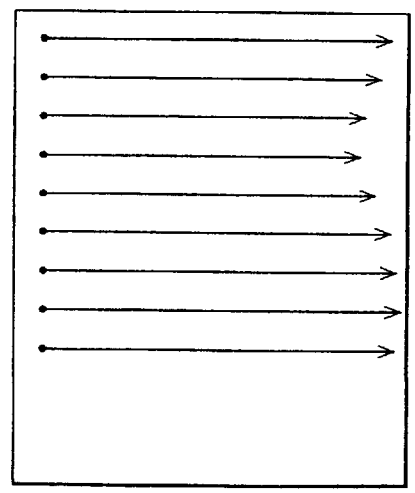
FIG.5A  FIG.5B

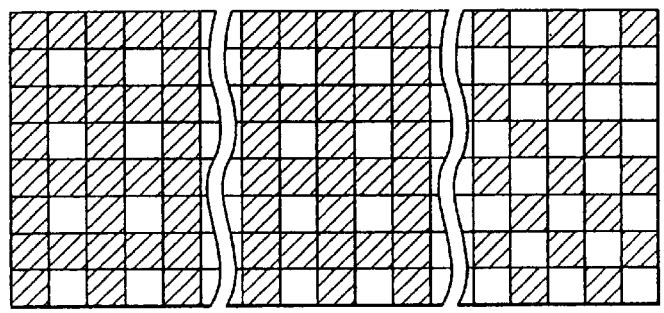
FIG.8A (PRIOR ART)
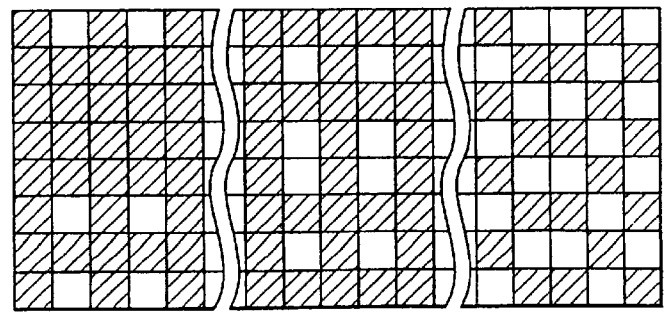
FIG.8B (PRIOR ART)
FIG.8C (PRIOR ART)

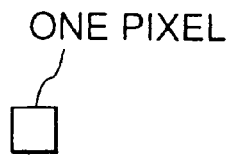
ONE PIXEL
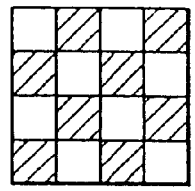
FIG.9A
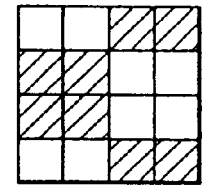
FIG.9B
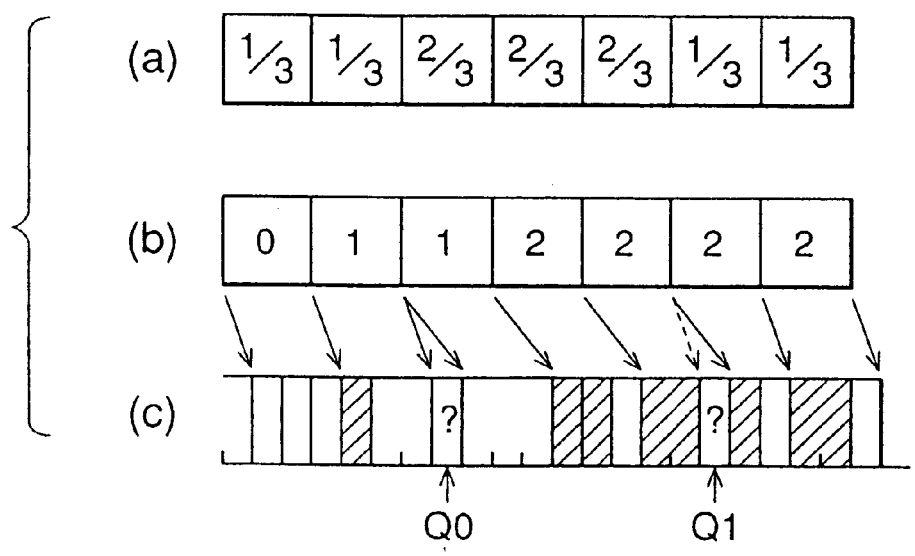
FIG.10

WHEN AMOUNT OF DEVIATION IS "0"
(a) 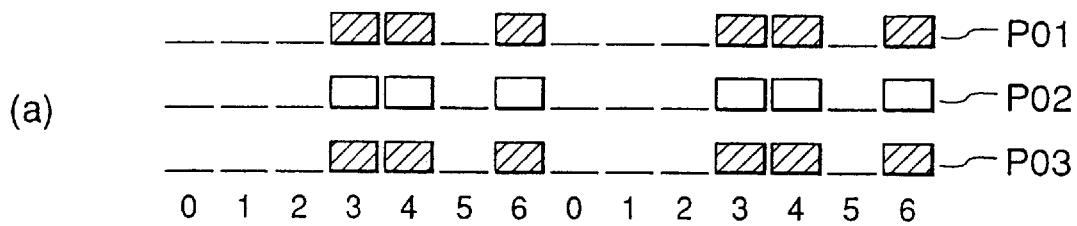
WHEN AMOUNT OF DEVIATION IS "1"
(b) 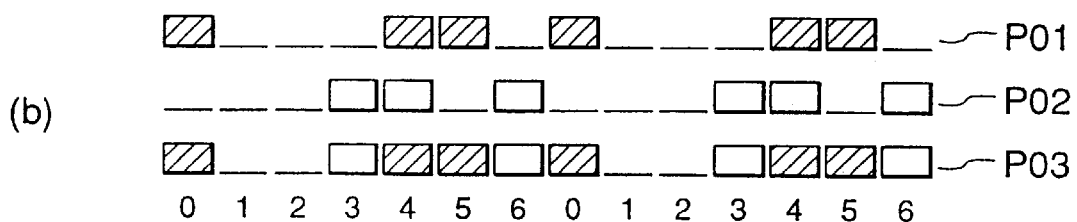
WHEN AMOUNT OF DEVIATION IS "2"
(c) 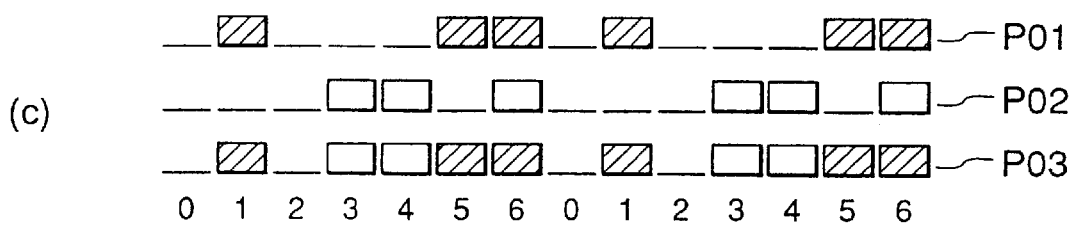
WHEN AMOUNT OF DEVIATION IS "3"
(d) 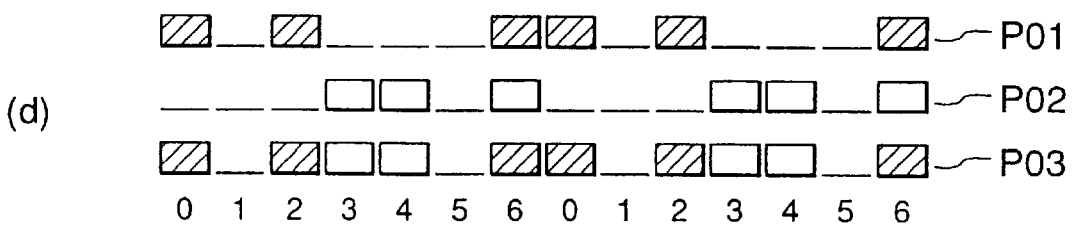
WHEN AMOUNT OF DEVIATION IS "4"
(e) 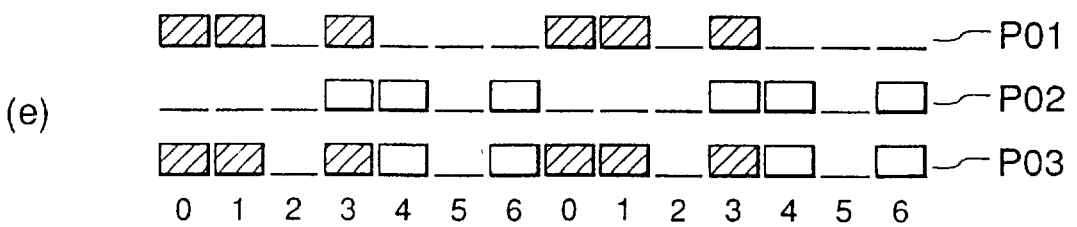
FIG.15

```
      -2 -1 0  1  2
  X  -2 □ □ □ □ □

Y  -1 □ □ □ □ □

0 □ □ □ □ □

+1 □ □ □ □ □

+2 □ □ □ □ □
```

COLOR IMAGE PRINTING SYSTEM CAPABLE OF CORRECTING DENSITY DEVIATION ON IMAGE AND SYSTEM FOR DETECTING COLOR DEVIATION ON IMAGE

BACKGROUND OF THE INVENTION

The present invention relates generally to an image recording system for recording a color image. More specifically, the invention relates to an image recording system for correcting the deviation of position of a scanning line forming a recorded image, and for correcting the deviation of density of the recorded image based on the deviation of position of the scanning lines.

In addition, the present invention relates to a method for recording a pattern to detect the presence of deviation of color which is the deviation of relative position between pictures of the respective colors in a color image recording system, and a color-deviation detecting system for detecting the deviation of color using a pattern recorded by the method.

In image recording systems for outputting a color image signal prepared by a computer as a hard copy, so-called color printers, image forming processes of various types, such as an electrophotographic form, an ink-jet form and a thermal transfer form, have been made fit for practical use. In particular, in the present circumstance, the electrophotographic form is the most suitable for high picture-quality printers due to the advantage of the electrophotographic form being able to record an image of a high picture quality at a high speed. As is well known, in the electrophotographic form, a laser light having an intensity modulated in accordance with an image signal scans on a photosensitive drum to form an electrostatic latent image in accordance with the image signal, and the formed electrostatic latent image is developed by a toner to form a visible image.

In a color printer of the electrophotographic form, a color image is formed by performing the aforementioned series of image forming processes using toners of three colors including yellow, magenta and cyan, or using toners of four colors including black in addition thereto. The deviation of relative positions of scanning lines forming a recorded image between image forming systems of the plurality of colors, causes so-called color deviation, so that there is a problem in that the picture quality notably deteriorates. Specifically, color deviation appears in the form of bleeding produced on lines of red, green and so forth in the recorded image. Since the deviation of relative positions of scanning lines is visible even if its amount is about 150 $\mu$m, this deviation must be less than this value in order to obtain a recorded image of a high picture quality.

Such a deviation of relative positions of scanning lines in an image forming system of a plurality of colors is caused by the distortion of a scanning line itself in image scanning systems of the respective colors, the deviation of relative scanning starting positions and so forth. The former is caused by the distortion of a light scanning system, the eccentricity of a photosensitive drum and so forth, and the deviation of color occurs if the characteristics of distortions of the respective colors are different. In addition, the latter is caused by the deviation of the mounting positions of developing machines for the respective colors and so forth. The distortion in the scanning line itself may correspond to a partial deviation from the original position of the scanning line if viewed locally. Therefore, throughout the specification, the distortion of the scanning line itself and the deviation of the relative scanning starting positions will be generally referred to as "the deviation of position of a scanning line".

As a method for preventing such a deviation of position of a scanning line, there are methods for fully increasing the scanning accuracy and the mounting accuracy of components. However, in these methods, there is a problem in that the manufacturing cost increases since it is required to precisely work parts and the assembling manday increases.

On the other hand, as a method for solving the problem of causing the color deviation at a low cost, there is known a method for correcting the deviation of positions of a scanning line by a signal processing (Japanese Patent Laid-Open Nos. 4-317247 and 4-326380). In this method, the deviation of position of a scanning line is previously stored, and the correction is performed by outputting the image data on the deviated position. Although this method has no advantageous effects with respect to random color deviation which can not predicted, it is an effective method for correcting the deviation of color due to the deviation of position of a scanning line since most of the distortions of scanning lines are put under the rule of components which can be predicted. In addition, there is known an example for applying the similar method to a color-deviation correction in a printer using solid luminescent elements such as a LED array, not a laser-light scanning system (Japanese Patent Laid-Open Nos. 4-291372 and 4-281476).

The principle of the aforementioned conventional method for correcting the deviation of position of a scanning line by signal processing will be described below in detail below.

In this method, the amount of deviation of a scanning line from its ideal position is predicted, and the correction is performed by outputting image data on the deviated position. For example, when a scanning line is distorted as shown by a solid line of FIG. 7, the image data on picture elements expressed by the sign □ are outputted to the scanning line, so that the image is recorded at a position which is to be originally recorded, regardless of the distortion of the scanning line. Furthermore, the prediction for the amount of the deviation of position of the scanning line is performed by previously measuring the amount of deviation or by measuring the amount of deviation before image recording.

However, in this method, since the positions of picture elements are shifted for correcting the deviation of position of the scanning line, the pattern of recorded picture-points varies. In particular, in the case of correcting the position of the scanning line in the vertical scanning direction, the correction can be only performed every unit of one picture element as the minimum unit, so that the correction of the position by one picture element may be performed even if the amount of deviation of the scanning line between the adjacent picture elements is considerably smaller than one picture element. For that reason, the correction causes the disappearance of the picture-point data and the variation of the relationship between the adjacent picture points. The disappearance of the picture-point data causes the deviation of density fluctuations (which will be hereinafter referred to as "density deviation") of the recorded image since the picture point to be originally present disappears. The variation of the relationship between the adjacent picture points also causes the density deviation due to the variation of the pixel pattern. In particular, in the electrophotographic recording, since the laser beam is usually wider than the size of a picture element, the state of the adjacent picture points varies so as to vary the pattern of picture points, so that the amount of toner fluctuates so as to fluctuate the density of the recorded image.

Referring to FIGS. 8A through 8C, specified examples will be described. The correction of deviation of position in the vertical scanning direction will be described herein. FIGS. 8A through 8C show positional-deviation signals in the vertical scanning direction, original image signals before the correction of positional deviation, and image signals after the correction of positional deviation, respectively. The number "0" in the positional-deviation signal represents that there is no deviation of position, and the number i (1, 2, . . . ) represents that the position of the scanning line deviates downwards by i picture elements in the figure. By this processing for correcting the deviation of position of the scanning line on the basis of the positional-deviation signal, the original image signals of FIG. 8B are corrected as shown in FIG. 8C.

As can be seen from the comparison between FIGS. 8B and 8B, the number of the picture points of the original image signals is doubled in the region expressed by P0 in the figure, the picture points disappear in the region expressed by P1, and the pattern of picture points varies in the region expressed by P2, so as to produce the deviation of density. Although these deviations in density are also observed in a binary image drawn by a line, they are particularly conspicuous in an image expressed by the pseudo tone processing such as the error diffusion method and the dither method.

In this way, according to the conventional method for correcting the deviation of position of a scanning line by signal processing, although the deviation of position itself can be decreased, there are problems in that the smooth line can not be drawn, the deviation of density in a pseudo tone image occurs, and a string-like noise is produced.

As mentioned above, in the conventional technique which corrects the deviation of position of a scanning line by signal processing in a color printer, there are problems in that a line can not be smoothly drawn in a recorded image, the density of an image expressed by the pseudo tone such as the dither method and the error diffusion method can not be correctly expressed, and a string-like noise is produced.

By the way, in a color printer having an individual recording stage for each color, if there are the deviation of relative recording position in the recording stage for each color, or if there is the deviation of a recording paper by a paper feeding mechanism, the deviation of relative position between the pictures by each color occurs. Such a deviation of relative position is generally called color deviation, which considerably deteriorates the picture quality of a recorded color image.

Therefore, there are proposed techniques for detecting the presence of color deviation to adjust the position of a recording stage and a paper feeding mechanism, and for detecting the amount of color deviation to move the coordinate point of the recorded image data by an amount corresponding thereto, to correct the color deviation. It is the point of the correction of color deviation how to the correction of the color deviation can be accurately and simply detected.

As a method for detecting the amount of color deviation, there is known a method for recording a detecting mark called "register mark" every color to observe the recorded register mark by a microscope, as is well known in the field of printing. However, it is very complicated that an user in general observes a register mark by a microscope.

On the other hand, Japanese Patent Laid-Open No. 6-118735 discloses a system for detecting a color deviation using an inexpensive detector. In this system, the amount of a color deviation is detected by recording angle color-deviation detecting marks which have different colors in printers for the respective colors, and by discriminating the time when the marks for the respective colors passing through a detector on the basis of the rise timing of an output signal of the detector. In this system, the detecting accuracy is considerably lowered when the detector is soiled by toner or paper powder or when the density of the color-deviation detecting mark varies. Moreover, since the detector is arranged within a printer, as the temperature inside of the printer increases, the rise characteristic of the output signal of the detector fluctuates to produce a detecting error.

As mentioned above, the method for detecting a color deviation by the observation by means of a microscope is very complicated. In addition, in the method for detecting a color deviation by detecting a detecting mark by a detector, a detecting error occurs due to the soiled detector, the variation of density of the mark, the fluctuation of the surrounding temperature and so forth, so that there are many problems with respect to its reliability.

SUMMARY OF THE INVENTION

It is therefore an object of the present invention to provide an image recording system which can correct the positional deviation of a scanning line without a baneful influence such as the decreasing of smoothness of a line and the occurrence of a string-like noise in a pseudo tone image.

In order to accomplish the aforementioned and other objects, according to the present invention, when the positional deviation of a scanning line forming a recorded image is corrected, the density deviation of the recorded image is also corrected on the basis of the pixel pattern of an image signal.

That is, according to tone aspect of the present invention, an image recording system for deriving a recorded image by scanning on the basis of a recording signal produced from an image signal, basically comprises: positional-deviation amount indicative signal producing means for producing a positional-deviation amount indicative signal representative of a positional deviation of a scanning line forming the recorded image; positional-deviation correcting means for correcting the positional deviation of the scanning line on the basis of the positional-deviation amount indicative signal produced from the positional-deviation amount indicative signal producing means; and density-deviation correcting means for correcting a density deviation of the recorded image due to the correction of the positional deviation by the positional-deviation correcting means, on the basis of a pixel pattern of the image signal.

Thus, by correcting a positional deviation of a scanning line forming a recorded image and by correcting a density deviation on the basis of a pixel pattern of an image signal, it is possible to maintain the smoothness of a line and to prevent a density deviation for occurring in a pseudo tone image.

The density-deviation correcting means may comprise: first detecting means for detecting a picture element wherein a spacial variation of the positional-deviation amount indicative signal occurs; second detecting means for detecting a pixel pattern around a picture element to be noticed in the image signal; and density correcting means for correcting the density of the image signal at a position corresponding to the picture element to be noticed, on the basis of the output signal from the first and second detecting means.

Specifically, the first detecting means may detect the picture element wherein the spacial variation of the image signal occurs, by detecting the variation of a component in the vertical scanning direction of the positional-deviation amount indicative signal around the picture element to be noticed. In addition, when the picture element wherein the spacial variation occurs is detected by the first detecting means and when the pixel pattern of the image signal around the picture element to be notice, which is detected by the second detecting means, is coincident with a predetermined pattern or a plurality of predetermined patterns, the density correcting means may correct the density deviation with respect to the image signal of the picture element to be noticed, in accordance with the set of the coincident pattern and the position of the picture element wherein the spacial variation occurs, detected by the first detecting means.

According to another aspect of the present invention, an image recording system for deriving a recorded image by scanning on the basis of a recording signal consisting of a pulse-width modulation signal produced from an image signal, comprises: positional-deviation amount indicative signal producing means for producing a positional-deviation amount indicative signal representative of a positional deviation of a scanning line forming the recorded image; positional-deviation correcting means for correcting the positional deviation of the scanning line on the basis of the positional-deviation amount indicative signal produced from the positional-deviation amount indicative signal producing means, with respect to the image signal; density-deviation correcting means for correcting a density deviation of the recorded image due to the correction of the positional deviation by the position-deviation correcting means, with respect to the image signal outputted from the positional-deviation correcting means, on the basis of a pixel pattern of the image signal; and signal converting means for converting the image signal outputted from the density-deviation correcting means, into a pulse-width modulation signal to derive the recording signal.

According to further aspect of the present invention, an image control system comprises: positional-deviation amount indicative signal producing means for producing a positional-deviation amount indicative signal representative of a positional deviation of a scanning line forming the recorded image; positional-deviation correcting means for correcting the positional deviation of the scanning line on the basis of the positional-deviation amount indicative signal produced from the positional-deviation amount indicative signal producing means; density-deviation correcting means for correcting a density deviation of the recorded image due to the correction of the positional deviation by the positional-deviation correcting means, with respect to the image signal outputted from the positional-deviation correcting means, on the basis of a pixel pattern of the image signal; and signal converting means for converting the image signal outputted from the density-deviation correcting means, into a pulse-width modulation signal to derive the recording signal.

Thus, by correcting a positional deviation and a density deviation at the stage of a digital signal before an image signal is converted into a pulse-width modulation signal, the construction of the signal processing system for the correction of positional-deviation/density-deviation becomes simple.

According to further aspect of the present invention, an image recording system for deriving a recorded image by horizontal scanning and vertical scanning on the basis of a recording signal consisting of a pulse-width modulation signal produced form an image signal, comprises: positional-deviation amount indicative signal producing means for producing a positional-deviation amount indicative signal representative of a positional deviation of a scanning line forming the recorded image in the horizontal and vertical scanning directions; positional-deviation correcting means for correcting the positional deviation correcting means for correcting the positional deviation of the scanning line in the vertical scanning direction on the basis of the positional-deviation amount indicative signal in the vertical scanning direction produced form the positional-deviation amount indicative signal producing means, with respect to the image signal; density-deviation correcting means for correcting a density deviation of the recorded image in the vertical scanning direction due to the correction of the positional deviation by the positional-deviation correcting means, with respect to the image signal outputted from the positional-deviation correcting means, on the basis of a pixel pattern of the image signal; signal converting means for converting the image signal outputted from the density-deviation correcting means, into a pulse-width modulation signal to derive the recording signal; and pulse-width modulation signal correcting means for deriving the recording signal by correcting the pulse-width modulation signal outputted from the signal converting means, on the basis of the positional-deviation amount indicative signal in the horizontal scanning direction produced by the positional-deviation amount indicative signal producing means.

The pulse-width modulation signal correcting means may comprises: horizontal-scanning direction positional-deviation correcting means for correcting the positional deviation in the horizontal scanning direction of the scanning line, with respect to the pulse-width modulation signal, on the basis of the positional-deviation amount indicative signal in the horizontal scanning direction; first detecting means for detecting a picture element wherein a spacial variation of the positional-deviation amount indicative signal in the horizontal scanning direction occurs; second detecting means for detecting a pixel pattern around the picture element to be noticed of the image signal; and density correcting means for correcting the density by varying the pulse-width modulation signal at the position corresponding to the picture element to be noticed, on the basis of the output signals from the first and second detecting means.

Thus, by correcting the pulse-width modulation signal in accordance with the positional-deviation in the horizontal scanning direction and also by correcting the density, it is not possible to only correct the positional deviation and the density deviation in the vertical scanning direction, but also to correct the positional deviation and the density deviation in the horizontal scanning direction.

According to further aspect of the present invention, an image recording system for deriving a recorded image by scanning on the basis of a recording signal consisting of a pulse-width modulation signal produced form an image signal, comprises: first signal converting means for converting an inputted pulse-width modulation signal into a first image signal; positional-deviation amount indicative signal producing means for producing a positional-deviation amount indicative signal representative of a positional deviation of a scanning line forming a recorded image; positional-deviation correcting means for correcting a positional deviation of the scanning line, with respect to the first image signal, on the basis of the positional-deviation amount indicative signal produced by the positional-deviation amount indicative signal producing means, to derive a second image signal; density-deviation correcting means for correcting a density deviation of the recorded image due to the correction of the positional deviation by the positional-deviation correcting means, with respect to the image signal outputted from the positional-deviation correcting means. On the basis of a pixel pattern of the first or second image signal, to derive a third image signal; and a second signal converting means for converting the third image signal into a pulse-width modulation signal, to derive a recording signal.

Thus, after the inputted pulse-width modulation signal is converted into the image signal, the correction of positional deviation and density deviation is performed, and thereafter, the image signal is converted into the pulse-width modulation signal again to be outputted as a recording image signal. Therefore, the construction of the signal processing system for the correction of positional-deviation/density-deviation is simple, and the first signal converting means for converting the image signal into the pulse-width modulation signal can be independent of the signal processing system for the correction of positional-deviation/density-deviation, so that it is easy to design the system when the first signal converting means has a signal processing function such as tone processing and smoothing processing.

According to still further aspect of the present invention, an image recording system for deriving a recorded color image by scanning of each of black and primary colors on the basis of recording signals of black and primary colors produced on the basis of a color image signal, comprises: positional-deviational amount indicative signal producing means for producing a positional-deviation amount indicative signal representative of a positional deviation of a scanning line forming images of at least primary colors of the color image signal; positional-deviation correcting means for respectively correcting positional deviations of scanning lines forming the images of at least primary colors of the color image signal on the basis of the positional-deviation amount indicative signal produced by the positional-deviation amount indicative signal producing means; and density-deviation correcting means for correcting density deviations of images of at least primary colors of the color recording image, due to the correction of positional deviation by the positional-deviation correcting means, on the basis of a pixel pattern of the color image signal.

Thus, by correcting the positional deviation and the density deviation of the scanning line with respect to the color image signal, it is possible to prevent color deviation due to the relative positional deviation of the scanning line between the recording images for the respective colors, and it is also possible to restrain the density fluctuation and the occurrence of string-like noise in the color recording image.

As mentioned above, according to an image recording system of the present invention, it is possible to correct the positional deviation of the scanning line without reducing the smoothness of the line and without producing the density fluctuation and the string-like noise due to the density fluctuation in the pseudo tone image, and it is possible to obtain a high quality of recording image.

The detection of color deviation for the correction of color deviation due to the correction of the positional deviation will be described in detail below.

It is another object of the present invention to provide a recording method and a color-deviation detecting system for color-deviation detection which can detect simply and accurately the presence and amount of color deviation with the naked eye or with a detector.

In order to accomplished the aforementioned and other objects, according to one aspect of the present invention, there is provided a recording method for detecting a relative positional deviation between images of a plurality of colors in a color image recording system which records images of the plurality of colors, wherein first and second patterns of different colors are superposed on each other to be recorded so that the color appearing on a superposed pattern varies in accordance with a relative positional deviation between the first and second patterns, in comparison with when the relative positional deviation occurs and when no relative positional deviation occurs.

Specifically, the first pattern may be a pattern of a non-chromatic color, and the second pattern may be a pattern of a chromatic color. These patterns may be superposed on each other to be recorded so that a superposed pattern of only the non-chromatic color occurs when no relative positional deviation occurs, and a superposed pattern containing the chromatic color when a relative positional deviation occurs. Alternatively, these patterns may be superposed on each other to be recorded so that a color difference of a superposed pattern with respect to the non-chromatic color varies in accordance with a relative positional deviation between both patterns.

In addition, one of the first and second patterns may comprise a plurality of unit patterns having the same pattern and the same phase, and the other of the first and second patterns may comprise a plurality of unit patterns having the same pattern and phases, each of which is sequentially shifted from that of the adjacent unit pattern.

Moreover, each of the first and second patterns may be a periodic pattern, and a ratio of the number of picture elements per a period in which the first and second patterns are not superposed on each other, may be 0.25 or more when no relative positional deviation occurs.

According to another aspect of the present invention, a color-deviation detecting system comprises: recording means for superposing a first pattern of a non-chromatic color and a second pattern of a chromatic color on each other to record a superposed pattern so that a color difference of the superposed pattern with respect to the non-chromatic color varies in accordance with a relative positional deviation between the first and second patterns; and color-deviation detecting means for optically detecting the color difference of the superposed pattern recorded by the recording means, to detect the relative positional deviation between the first and second patterns.

According to further aspect of the present invention, a color-deviation detecting system comprises: recording means for superposing a first pattern consisting of a periodic pattern of a non-chromatic color and a second pattern consisting of a periodic pattern of a chromatic color on each other to record a superposed pattern so that a color difference of the superposed pattern with respect to the non-chromatic color varies in accordance with a relative positional deviation between the first and second patterns; a color reading means for reading the superposed pattern recorded by the recording means; and color-deviation detecting means for averaging an output of the color reading means over a period of the periodic pattern, to detect the relative positional deviation between the first and second patterns.

Thus, according to the present invention, since the first and second patterns of different colors are superposed on each other to be recorded so that the appeared color of the superposed pattern varies in accordance with the relative positional direction between the first and second patterns, it is possible to easily detect the presence and amount of color deviation with the naked eye on the basis of the appeared color of the superposed pattern, without the need of any observing devices required to have a high resolution, such as a high definition detector and a microscope.

That is, if a pattern of a non-chromatic color is used as the first pattern and a pattern of a chromatic color is used as the second pattern, and if these patterns are the same pattern, the superposed pattern becomes a pattern of a non-chromatic color when the first and second patterns are completely superposed without any color deviations, and the first and second patterns are relatively shifted to be superposed to cause the chromatic color of the second pattern to appear when a color deviation occurs.

In addition, when the first and second patterns are completely superposed without any color deviations, the superposed pattern becomes a pattern of a non-chromatic color, and when a color deviation occurs, the chromatic color of the second pattern appears at the superposed pattern. Therefore, since the color difference occurs between the superposed pattern having no color deviation and the superposed pattern having color deviation, so that it is possible to recognize the presence of color deviation.

In addition, if one of the first and second patterns comprises a plurality of unit patterns having the same pattern and the same phase, and if another comprises a plurality of unit patterns having the same pattern and having a sequentially shifted phase, it is possible to recognize the amount of color deviation by the phase of the unit pattern having a color which varies in accordance with the amount of color deviation, i.e. by the variation of the unit pattern of a non-chromatic color or the unit pattern having no color differences.

On the other hand, if periodic patterns are used as the first and second patterns and if the ratio of the number of picture elements per a period wherein both patterns are not superposed when no color deviation occurs is 0.25 or more, the presence of the pattern of a chromatic color and the variation of color difference in the superposed pattern are notably caused when color deviation occurs, so that it is possible to more easily detect the presence and amount of color deviation.

In addition, if the first and second patterns of a non-chromatic and a chromatic colors wherein the color difference of the superposed pattern varies in accordance with the presence and amount of color deviation, are superposed to be recorded to optically detect the color difference, it is possible to automatically detect the presence and amount of color deviation. In this case, the detection results do not depend on the rise characteristic of the optical detector, so that stable and accurate detection can be performed.

Moreover, if the first and second patterns comprising periodic patterns of non-chromatic and chromatic colors wherein the color difference of the superposed pattern varies in accordance with the presence and amount of color deviation, are superposed to be recorded, and if the output of the superposed pattern read by color reading means is averaged over a period of the periodic pattern, it is possible to automatically detect the presence and amount of color deviation. In this case, the detection results do not depend on the rise characteristic of the optical detector, and the noise is averaged, so that stable and accurate detection can be performed without any influences by noise.

As mentioned above, according to the present invention, it is possible to easily detect the presence of color deviation with the naked eye, by superposing and recording the first and second patterns of different colors, for example, a pattern of a non-chromatic color and a pattern of a chromatic color, such that the color of the superposed pattern varies in accordance with the presence of relative positional deviation between both patterns, specifically, such that the superposed pattern becomes a pattern of only a non-chromatic color or a pattern including a chromatic color, or the color difference varies in accordance with the relative position deviation.

In addition, if one of the first and second patterns comprises a plurality of unit patterns having the same pattern and the same phase, and if the other comprises a plurality of unit patterns having the same pattern and a sequentially shifted phase, it is not possible to only detect the presence of color deviation, but also to easily the amount of color deviation with the naked eye, on the basis of the phase of the unit pattern wherein the appeared color varies in accordance with the amount of color deviation, i.e. on the basis of the variation of the unit pattern of only a non-chromatic color or the unit pattern having no color difference.

Moreover, if the first and second patterns of non-chromatic and chromatic colors wherein the color difference of the superposed pattern varies in accordance with the presence and amount of color deviation, are superposed to be recorded, and if the color difference is optically detected to the output obtained by reading the superposed pattern by color reading means is averaged over a period of the periodic pattern, it is possible to stably, accurately and automatically detect the presence and amount of color deviation, independent of the rise characteristic of the detector and under no influence of noise.

BRIEF DESCRIPTION OF THE DRAWINGS

In the drawings:

FIG. 4 is a schematic view of a developing unit;

FIGS. 5A and 5B are views, each illustrating an example of the positional deviation of a scanning line in a recorded image;

FIGS. 8 through 8C are views, each illustrating the deviation of pixel pattern due to a vertical-scanning positional-deviation correction;

FIGS. 9A and 9B are views, each illustrating the density fluctuation due to the variation of a pixel pattern in a recorded image;

FIG. 10 is a view illustrating the density fluctuation due to a horizontal-scanning positional-deviation correction in a recorded image;

FIG. 15 is a view illustrating first and second patterns for detecting the color deviation and the superposed pattern thereof in the fifth preferred embodiment according to the present invention;

DETAILED DESCRIPTION OF THE PREFERRED EMBODIMENTS

Referring now to the accompanying drawings, the preferred embodiments of the present invention will be described below.

First Preferred Embodiment

Figure 1:
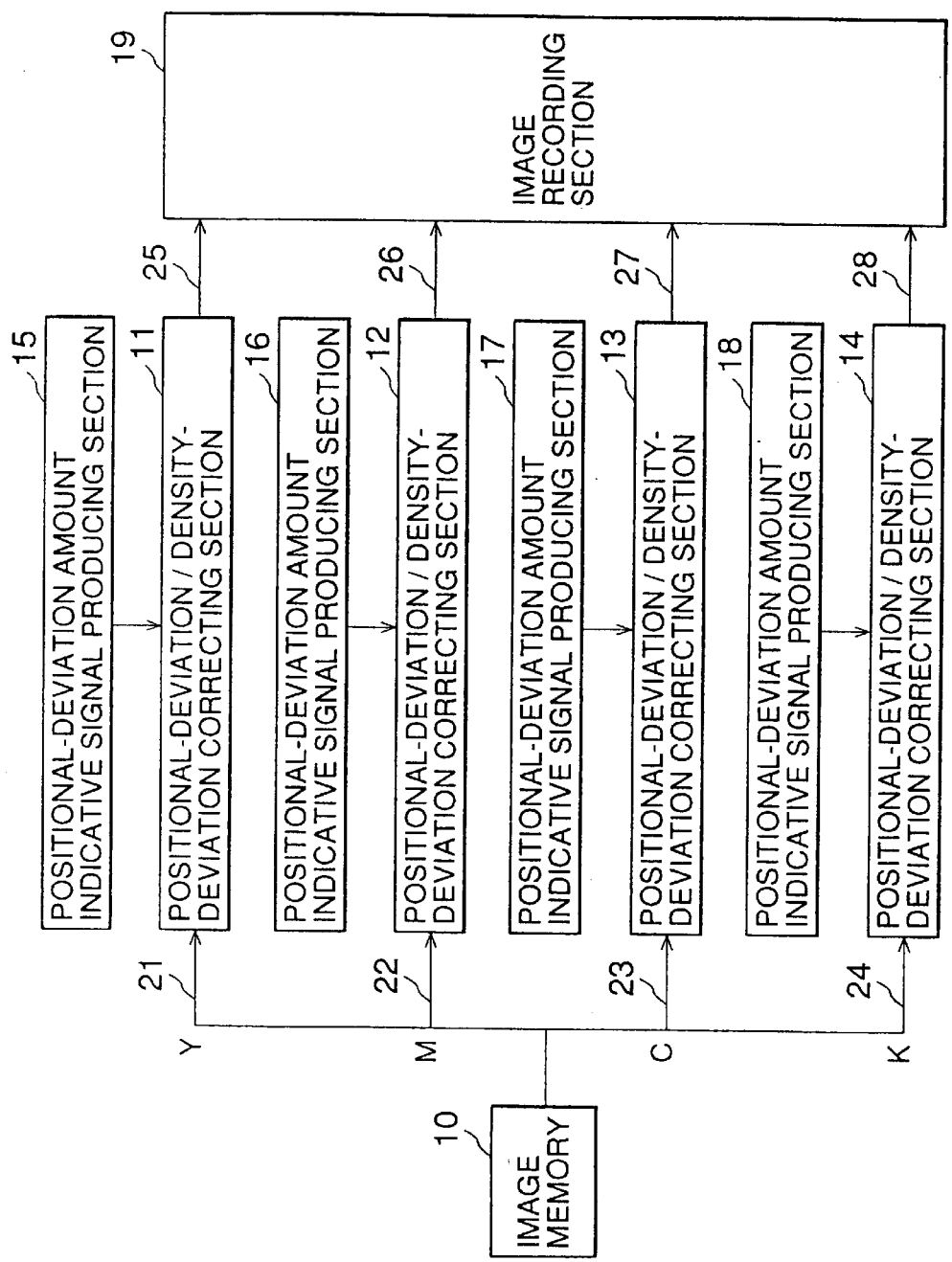
FIG. 1 is a block diagram of the first preferred embodiment of a color image recording system according to the present invention.

First, referring to FIG. 1, the schematic construction and operation of the first preferred embodiment of a color image recording system, according to the present invention, will be described. In FIG. 1, an image memory 10 stores therein as color image data, for example, image data corresponding to four colors including yellow (Y), magenta (M), cyan (C) and black (K). The color image signals read out of the image memory 10, i.e. image signals 21 through 24 for yellow, magenta, cyan and black, are inputted to positional-deviation/density-deviation correcting sections 11 through 14.

The positional-deviation/density-deviation correcting sections 11 through 14 produce recording signals 25 through 28 for yellow, magenta, cyan and black by correcting the deviation of the position of a scanning line which forms pictures of yellow, magenta, cyan and black on the basis of positional-deviation amount indicative signals which are produced by positional-deviation amount indicative signal producing sections 15 through 18 and each of which represents the amount of the deviation of the position of each of pictures for yellow, magenta, cyan and black in a recorded color image, and by correcting the density of each of pictures of yellow, magenta, cyan and black with respect to the image signals 21 through 24 in accordance with the pixel patterns of the image signals 21 through 24. In the case of a color printer of the electrophotographic recording system, an image recording section 19 records a color image prepared by toners of four colors including yellow, magenta, cyan and black in accordance with the recording signals 25 through 28. Furthermore, an ink-jet printer and a thermal transfer printer can also be used as the color printer.

The detailed constructions and operations of the respective sections of FIG. 1 will be described below.

In the image memory 10, image data for four colors (yellow, magenta, cyan and black) are stored as density data of a bit-map. The term "bit-map" means a map wherein image is divided nito minute square sections. The image memory 10 stores image data (density data) for yellow, magenta, cyan and black every minute square section. This minute square will be hereinafter referred to as a "picture element" or "pixel". In this preferred embodiment, the density data for each color are expressed by 4-bit, 16-level digital data per one picture element. The density data of this bit-map are written, as color image data, in the image memory 10 from a host computer (not shown) via a signal line. Alternatively, the image recording system may have a CPU therein, and the density data for yellow, magenta, cyan and black expressed by the page describing language written by the host computer may be expanded on the bit-map to be color image data.

The color image data thus stored in the image memory 10 as density data, are read out, in the order of the length of time, as image signals 21 through 24 for yellow, magenta, cyan and black in the raster scan. These image signals 21 through 24 for yellow, magenta, cyan and black are converted into recording signals 25 through 28 for yellow, magenta, cyan and black via positional-deviation/density-deviation correcting sections 11 through 14, and thereafter, they are supplied to the image recording section 19. In the image recording section 19, the raster scan is performed on a recording paper on the basis of the recording signals 25 through 28, and color image is recorded on the recording paper according to the color image data in the image memory 10.

Figure 2A:
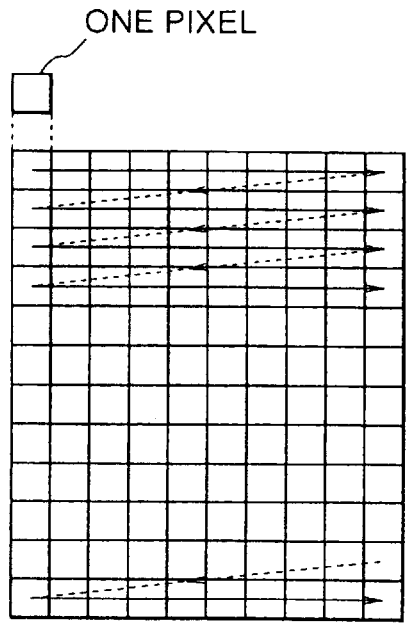
FIGS. 2A and 2B are views showing the relationship between scanning methods in an image memory and in a recorded image.
Figure 2B:
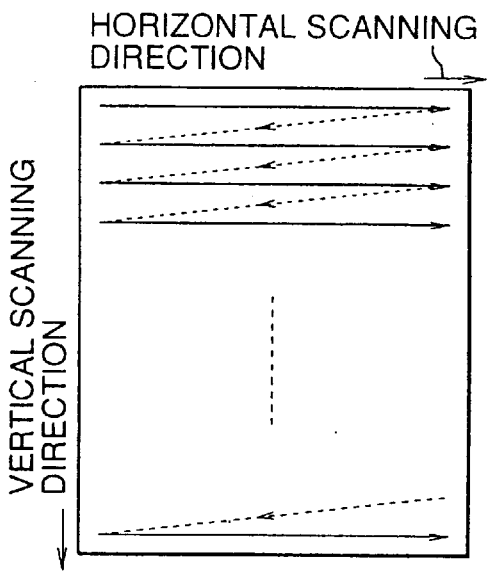

FIGS. 2A and 2B show the relationship between the image memory 10 and the raster scan of a recorded image. The direction of raster expressed by the arrow will be hereinafter referred to as a "horizontal scanning direction", and the direction running every raster will be hereinafter referred to as a "vertical scanning direction". The recording signals 25 through 28 are 1-bit signals, i.e. binary signals, which are individually pulse-width modulated for each of yellow, magenta, cyan and black, respectively.

The positional-deviation/density-deviation correcting sections 11 through 14 will be described in detail later.

Figure 3:
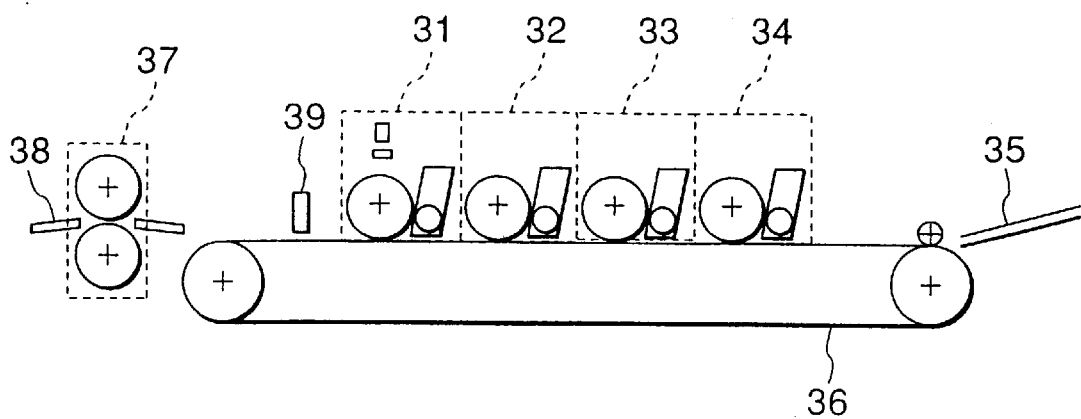
FIG. 3 is a schematic view of an image recording section.

Referring to FIG. 3, the construction of the image recording section 19 will be described below.

The image recording section 19 comprises separated developing unit 31 through 34 for four colors including yellow, magenta, cyan and black, a paper feeding section 35, a carrier belt 36, a fixing section 37, a paper discharging section 38 and a sensor 39. The four series of recording signals 25 through 28 inputted to the image recording section 19 are supplied to the exposure sections of the developing units 31 through 34, respectively. Since the constructions of the developing units 31 through 34 are the same except that the colors of toners are different, the developing unit 34 for black will be described below.

FIG. 4 illustrates the construction of the developing unit. In FIG. 4, the inputted recording signal is supplied by a semiconductor laser 41. The recording signal is a binary signal, the intensity of which is 0 or 1, the intensity varying with time. The laser light emitted by the semiconductor laser 41 is on-off controlled on the basis of the recording signal. The laser light emitted by the semiconductor laser 41 is reflected n a polygon mirror 43 through a first image-formation optical system 42, and thereafter, it is focused on a photosensitive drum 45 through a second image-formation optical system 44. The polygon mirror 43 is designed to rotate, and the focusing point moves along the axis of the photosensitive drum 45 in accordance with the rotation of the polygon mirror 43. In the second image-formation optical system, a f–θ lens is used so that light can be focused at any positions on the axis of the photosensitive drum 45. The scanning by the laser light on the basis of the recording signal is synchronized with the scan by one face of the polygon mirror 43, and one line of the photosensitive drum 45 is exposed by this scanning so as to correspond to the recording signal.

The photosensitive drum 45 is previously charged at an uniform potential by means of a charging device 46. When the photosensitive drum 45 is exposured by laser light, an electric charge of inverse polarity is produced at the expo-sured point, and the charged potential is negated. As a result, a potential distribution according to the exposure is formed on the photosensitive drum 45. By repeating the exposure scanning while rotating the photosensitive drum 45, a potential pattern corresponding to the data in the image memory 10 as shown in FIG. 1 is formed.

In accordance with the potential pattern thus formed on the photosensitive drum 45 by exposure, the charged black toner is attached to the photosensitive drum 45 by means of a developing machine 47 to perform development, so that black toner image is formed on the photosensitive drum 45. While the developing unit for black has been described above, the color of toner to be attached to the photosensitive drum 45 by the developing machine is yellow, magenta or cyan in the case of a developing unit for yellow, magenta or cyan.

The toner image thus attached to the photosensitive drum 45 is sequentially transferred to a recording paper to form a color image on the recording paper as will be described below. That is, the recording paper supplied from the paper feeding section 35 is carried by the carrier belt 36. The four developing units 41 through 44 are arranged on the passage of the carrier belt 36 so that the respective photosensitive drums 45 contact the recording paper. The toner images for the respective colors formed on the photosensitive drums 45 of the respective developing units 41 through 44 are sequentially transferred to the recording paper on the carrier belt 36. After all the toner images for yellow, magenta, cyan and black are transferred, the respective color toners transferred at the fixing section 37 are heated and melt to be fixed to the recording paper. Finally, the recording paper is discharged from the paper discharging section 38, so that the color image data in the image memory 10 are recorded at the corresponding position on the recording paper.

The sensor 39 arranged in front of the fixing portion 37 as provided for measuring the position of a reference image recorded on the recording paper or on the carrier belt 36 to measure the amounts of the deviations of density and position of toner images for the respective colors including yellow, magenta, cyan and black, on the basis of the position of the reference image. The detailed information on the amount of positional deviation will be described later.

By a series of processes as described above, a color image is formed on a recording paper. When the relative positions of the toner images of four colors are deviated, a color-deviation noise occurs to cause the deterioration of picture quality. For example, a red line is expressed by superposing lines of two colors including yellow and magenta. In this case, when the positions of the toner images of yellow and magenta are deviated from another, two separate lines are expressed to be substituted for the line to be red. The allowable value of these deviations is, but depends upon the type of the image, in the range of from about 50 to 200 $\mu$m. When the relative deviation exceeds this allowable value, the picture quality is notably deteriorated.

Such deviations of relative positions of the toner images of the respective colors are caused by the deviation of relative positions between the photosensitive drum 45 of the developing unit and the carrier belt 36, the deviation of the photosensitive drum 45 in the direction of the rotation axis, the eccentricity of the photosensitive drum 45, the distortion of a scanning line caused by the distortion of the scanning optical system, and the deviation of position of a scanning line due to the fluctuation of a scanning speed and so forth.

FIGS. 5A and 5B illustrate examples of the deviations of positions of scanning lines when the axis of the photosensitive drum 45 is inclined and when the photosensitive drum 45 is eccentrically arranged, respectively. In FIG. 5A, the actual scanning lines skew as expressed by solid lines, with respect to the ideal scanning liens expressed by broken lines. In FIG. 5B, the length and scanning speed of the scanning line fluctuates at different positions in the vertical scanning direction. They will be generally referred to as a "positional deviation of a scanning line".

Thus, since there are many factors causing the positional deviation of a scanning line, it is technically difficult to restrain all of them with accuracy. Even if it is possible, the manufacturing and adjusting costs increase. Therefore, according to the present invention, the positional-deviation/density-deviation correcting sections 11 through 14 correct such a positional deviation of a scanning line to correct the deviation of relative position between the toner images of the respective colors, and to correct the density deviation of the scanning line due to the correction of the positional deviation, so as to solve the aforementioned problems in the conventional method for correcting the positional deviation by signal processing.

Before the constructions of the positional-deviation/density-deviation correcting sections 11 through 14 are described, the principle of correcting the positional deviation of a scanning line in this preferred embodiment will be described below.

Figure 6:
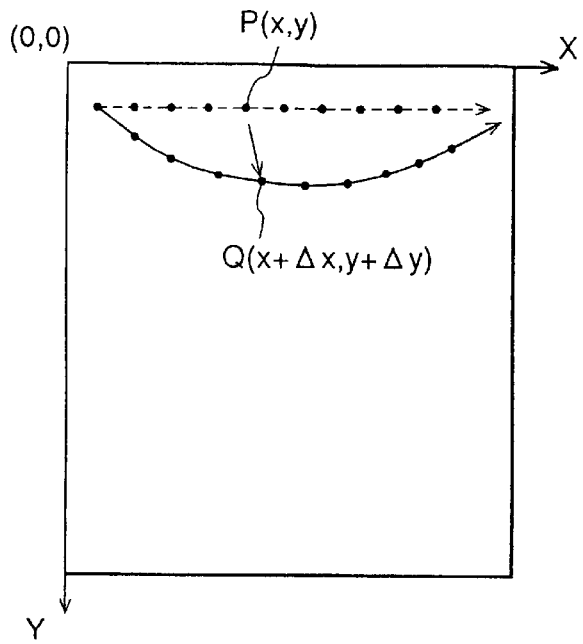
FIG. 6 is a view illustrating the principle of the correction of the positional deviation of a scanning line.

FIG. 6 is a schematic view illustrating the scanning position of a scanning line on a recording paper, wherein the solid line indicates the actual scanning position and the broken line indicates the ideal scanning position. When the image data to be recorded at the actual scanning position are outputted as a recording signal, it is possible to correct the influence on the positional deviation of the scanning line.

For convenience for explanation, as shown in FIG. 6, a coordinate system is made so that the horizontal and vertical scanning directions be the positive directions of x-axis and y-axis, respectively, and it is assumed that the length of one picture element is an unit length. It is also assumed that the ideal scanning point is P, and the actual scanning point is Q. Assuming that the coordinate of P is (s, y), and the coordinate of Q is (x+$\Delta$x, y+$\Delta$y), $\Delta$x and $\Delta$y indicate the amounts of the deviations of the scanning position, i.e.. the amounts of the locally positional deviations of a scanning line. In this case, if ($\Delta$x, $\Delta$y) are obtained with respect to the coordinates (x, y) of all the picture elements, when the coordinate (x, y) scans at the time of recording, i.e., when the picture element corresponding to the x th picture element of the y th raster is recorded, the information on the picture element corresponding to the coordinate (x+$\Delta$x, y+$\Delta$y) on the image memory 10 is outputted as a recording signal, so that it is possible to correct the positional deviation by ($\Delta$x, $\Delta$y).

However, if such a correction of the positional deviation is performed, the pixel pattern of the image signal varies, so that there is a problem in that the deviation of density is locally generated. This phenomenon is notable when the original image signal is a binary signal, so that string-line noises occur on the image expressed by the pseudo gray scale by the error diffusion method or the dither method, or discontinuous points of the density appears on a thin line. This is because arithmetic rule can not generally be established in the recording of a hard copy such as electrophotography, and the ratio and density of a black picture element on a recording image are not in proportion to another, but the macroscopical density varies by the pattern of the black picture element. For example, as will be described later, when the pixel pattern wherein the number of the adjacent black picture elements is relatively small as shown in FIG. 9A is compared with the pixel pattern wherein the number of the adjacent black picture elements is relatively great as shown in FIG. 9B, the density of FIG. 9A is usually higher than that of FIG. 9B. This is because the recording picture point corresponding to one picture element becomes wider than the size of the picture element when the number of the adjacent black picture element is great, so that it tends to overlap with the picture points of the vertically and horizontally adjacent picture elements.

When the deviation of density occurs at the locally pixel-pattern varying point by thus correcting the deviation of position of a scanning line, for example, in a pseudo tone image, similar pixel patterns continuously appear, and the points wherein the pixel pattern varies are usually arranged on the continuous line. Therefore, a string of a high density or a low density along this line appears as a noise. Moreover, in a picture such as a line, the line is deviated, or a high-density point or a low-density point occurs on the line so that this point appears as a noise.

According to the present invention, in order to prevent the noise due to the deviation of density thus produced by the correction of the deviation of position of a scanning line, the deviation of density is corrected making reference to the pixel pattern of image signals around a picture element to be noticed. Specifically, for example, a pixel pattern after the correction of the positional deviation is derived on the basis of the pixel pattern around the picture element to be noticed and of the corrected amount of the positional deviation, and the deviation of density on the recorded image is calculated from both of the pixel patterns. In this preferred embodiment, the image signal of the picture element to be noticed is corrected so as to correct the deviation of density.

The positional-deviation/density correcting sections 11 through 14 and the position-deviation amount indicative signal producing sections 15 through 18 in FIG. 1 will be specifically described below. Furthermore, in this preferred embodiment, the positional-deviation/density correction sections 11 through 14 and the positional-deviation amount indicative signal producing sections 15 through 18 are independently formed every color such as yellow, magenta, cyan and black, and the constructions thereof are the same for each color. Therefore, one of the positional-deviation/density correcting sections and one of the positional-deviation amount indicative signal producing sections will be described below.

Figure 11:
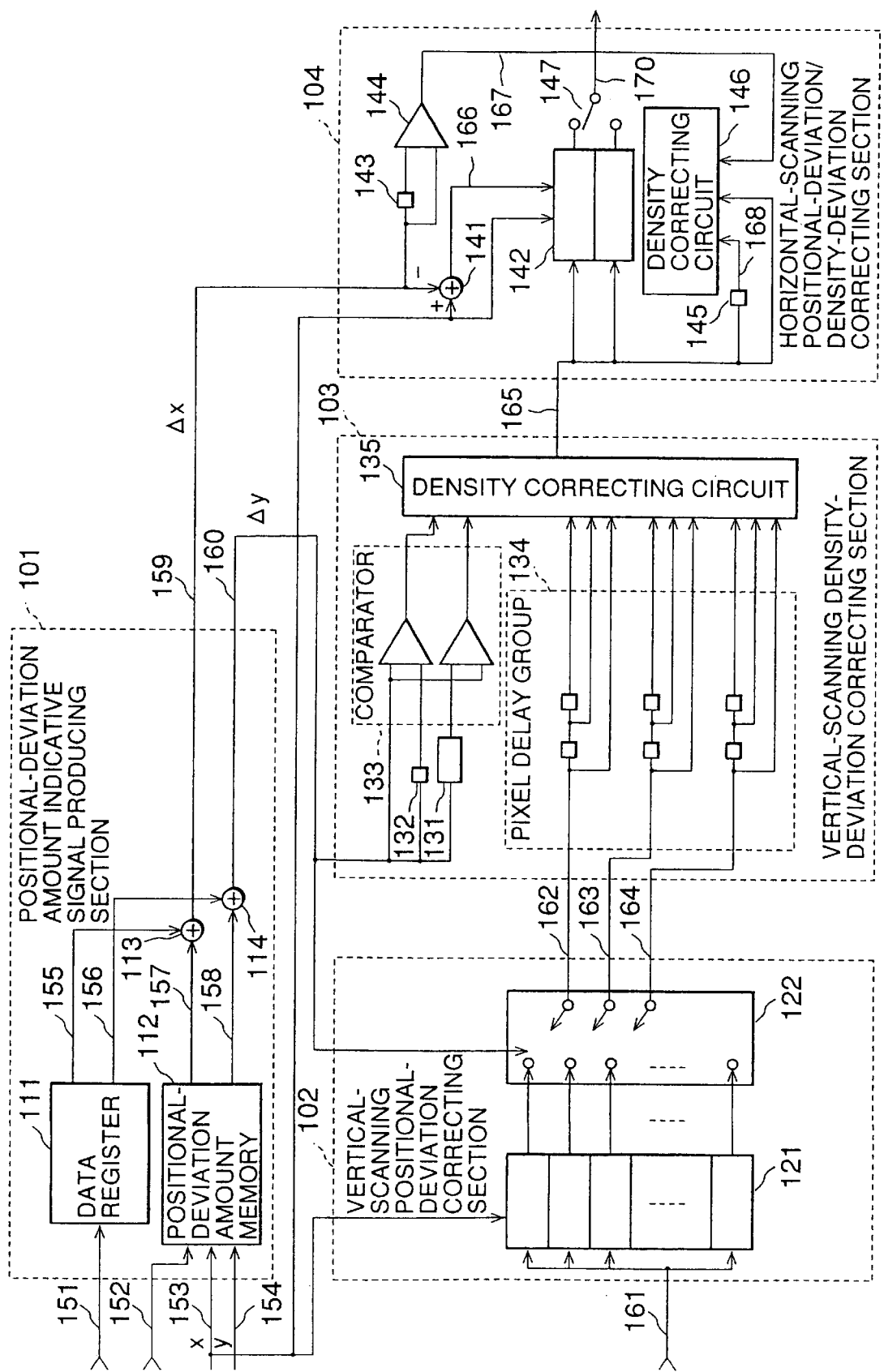
FIG. 11 is a block diagram showing a positional-deviation amount indicative signal producing section and a positional-deviation/density-deviation correcting section according to the present invention.

FIG. 11 illustrates the constructions of one of the positional-deviation/density correcting sections and of one of the positional-deviation amount indicative signal producing sections. A positional-deviation amount indicative signal producing section 101 produces positional-deviation amount indicative signals 159 and 160 in the order of the length of time, which represent the amounts $\Delta$x, $\Delta$y of the deviations of position of a scanning line at the position of a picture element to be recorded on the scanning line which is presently to be recorded in the image recording section 19. The positional-deviation/density-deviation correcting section comprises a vertical-scanning positional-deviation correcting section 102, a vertical-scanning density-deviation correcting section 103 and a horizontal-scanning positional-deviation/density-deviation correcting section 104.

While the vertical-scanning positional-deviation correcting section 102 inputs an image signal read out of the image memory 10, by means of the positional-deviation amount indicative signals 159 and 160 produced by the positional-deviation amount indicative signal producing section 101, it corrects the deviation of position in the vertical scanning direction of a scanning line forming a recorded image with respect to the image signal.

The vertical-scanning density-deviation correcting section 103 corrects the deviation of density in the vertical scanning direction of the recorded image due to the correction of the deviation of position in the vertical scanning direction, with respect to the image signal outputted from the vertical-scanning positional-deviation correction section 102.

The horizontal-scanning positional-deviation/density-deviation correcting section 104 corrects the deviations of position and density in the horizontal scanning direction of the scanning line forming the recorded image, with respect to the signal outputted from the vertical scanning density-deviation correcting section 103. The horizontal-scanning positional-deviation/density-deviation correcting section 104 also produces a recording signal to the image recording section 19 by converting the image signal into a pulse-width modulation signal.

The respective sections of FIG. 11 will be described below.

First, the positional-deviation indicative signal producing section 101 will be described. The positional-deviation indicative signal producing section 101 comprises a positional-deviation detecting data register 111 and a positional-deviation amount memory 112.

The positional-deviation detecting data register 111 stores simple and macroscopic positional-deviation data such as parallel displacements in the horizontal and vertical scanning direction. These positional-deviation data are, for example, positional-deviation data in the horizontal and vertical scanning directions written in the positional-deviation detecting data register 111 via a signal line 151, the positional-deviation data in the horizontal and vertical scanning directions being obtained by recording a predetermined positional-deviation detecting pattern, for example, a superposed pattern of a black pattern and the same chromatic-color (any one of yellow, magenta and cyan) pattern as the black pattern, on the carrier belt 36 in FIG. 3 when the electric power supply of the image recording system is activated, and by detecting the superposed pattern by means of the sensor 39 in FIG. 3. The positional-deviation data thus obtained can also correctly reflect a positional deviation fluctuating with time.

Furthermore, the positional-deviation detecting timing should be limited to the activating time of the electrical power supply of the image recording system. For example, it may be either immediately before a recording pater is recorded, or every time a predetermined period of time is elapsed. In these cases, it is also possible to detect a positional-deviation component of a short time constant in fluctuation with time. In addition, the positional-deviation detecting pattern may be recorded at a particular position on the recording paper, not on the carrier belt 36. The positional-deviation detecting data register 111 always outputs the positional-deviation data thus written, as a horizontal scanning direction positional-deviation indicative signal 155 and a vertical scanning direction positional-deviation indicative signal 156.

On the other hand, the positional-deviation amount memory 112 comprises a non-volatile memory. In this positional-deviation amount memory 112, there is written via a signal line 152, the information on macroscopic positional-deviation amounts $\Delta x$, $\Delta y$ corresponding to picture elements in the horizontal and vertical scanning directions of a scanning line forming a recorded image which has been previously measured. However, these positional deviation amounts $\Delta x$, $\Delta y$ are not required to be positional-deviation amounts corresponding to all the picture element, for example, may represent positional-deviation amounts of picture elements every 128 picture elements in both of the horizontal and vertical scanning directions. That is, assuming that the coordinate of the recorded image is (x, y), they are positional-deviation amounts at the picture element of a coordinate wherein both of x, y are multiples of 128.

In addition, the positional-deviation amount memory 112 inputs a horizontal scanning address signal 153 and a vertical scanning address signal 154 which represent the coordinate (x, y) of the picture element to be presently recorded. The content of the designated address is read out of the positional-deviation amount memory 112 on the basis of signals obtained by discarding insignificant 7 bits from either of the horizontal scanning address signal 153 and the vertical scanning address signal 154, and outputted as horizontal and vertical scanning direction positional-deviation amount indicative signals 157 and 158. Therefore, these positional-deviation amount indicative signals 157 and 158 represent the amount of positional deviation of a picture element which is arranged nearest and on the upper-left side of a picture element of a coordinate (x, y).

An adder 113 adds the positional-deviation amount indicative signals 155, 156 representative of the amount of macroscopic positional deviation of the scanning line which have been outputted from the positional-deviation detecting data register 111, to the positional-deviation amount indicative signals 157, 158 representative of the amount of microscopic positional deviation which have been outputted from the positional-deviation amount memory 112, and outputs final horizontal and vertical scanning direction positional-deviation signals 159, 160.

Furthermore, while the memory values of a picture element nearest and on the upper-left side of a picture element to be presently recorded in the positional-deviation amount memory 112 have been used as the positional-deviation amount indicative signals 157, 158 in the above description, for example, the positional-deviation amount indicative signals 157, 158 may be calculated by linear interpolation using four picture elements on the upper-left, upper-right, lower-left and lower-right sides. For example, when the coordinate (x, y) is expressed as follows:

x=x0+x1 (x0 is a multiple of 128, $0 \leq x1 < 128$)
y=y0+y1 (y0 is a multiple of 128, $0 \leq y1 < 128$), assuming that the positional-deviation amounts of the coordinate (x, y) are $\Delta x$ (x, y), $\Delta y$ (x, y), the following amount is calculated to be outputted as the positional-deviation amount indicative signals 157, 158.

$\Delta x$ (x, y)$\approx${(128−y1)·(128·128)}·$\Delta x$ (x0, y0)+{x1·(128−y1)/(128·128)}·$\Delta x$ (x0+1, y0)+{(128−x1)·y1/(128·128)}·$\Delta x$ (x0, y0+1)+(x1·y1/(128·128)}·$\Delta x$ (x0+1, y0+1)

$\Delta y$ (x, y)={(128−x1)·(128·y1)/(128·128)}·$\Delta y$ (x0, y0)+{x1·(128−y1)/(128·128)}·$\Delta y$ (x0+1, y0)+{(128−x1)·y1/(128·128)}·$\Delta y$ (x0, y0+1)+(x1·y1/(128·128)}·$\Delta x$ (x0+1, y0+1)

However, since the spacial variation of the amount of positional deviation is not so great, there is no great problem in an usual system if the memory values of the amount of positional deviation nearest and on the upper-left side of the picture element to be presently recorded are used as the positional-deviation amount indicative signals 157, 158 as mentioned above.

The vertical scanning positional-deviation correcting section 102 will be described below.

The vertical scanning positional-deviation correcting section 102 comprises a line memory row 121 and selector 122. When image recording section 19 of FIG. 1 scans at the coordinate (x, y), the image signal at the coordinate (x, y+$\Delta y$) read out of the image memory 10 is written in the line memory row 121 via a signal line 161 every one laster. That is, the line memory row 121 has memories of 11 lines, and writes the content of the y+5 th raster of the image memory 10 when it scans the y th line. The line memory row 121 always stores memory signals of 11 rasters from the y−5 th raster to the y+5 raster by sequentially switching the line memory to be written every laster and by writing a memory signal in a line memory wherein the oldest raster is stored.

The output of the line memory row 121 is switched to the output of the line memory which stores the image signal of the y+Δy th raster, by means of the selector 121 which is switched by the vertical scanning positional-deviation correcting signal 160 representative of the amount Δy of positional deviation in the vertical scanning direction, and an image signal 163 after the correction of vertical scanning positional-deviation. Similarly, the image signals of the y+Δy−1 th raster and the y+Δy+1 th raster in the line memory row 121 are selected to be outputted as image signals 162, 164 after the correction of vertical scanning positional-deviation.

The address of each line memory of the line memory row 121 is assigned by the horizontal scanning address signal 153, so that the image signals of the picture elements of the coordinates (x, y+Δy−1), (x, y+Δy) and (x, y+Δy+1) in the image memory 10 are outputted as the output signals of the vertical scanning positional-deviation correcting section 102, respectively.

Figure 7:
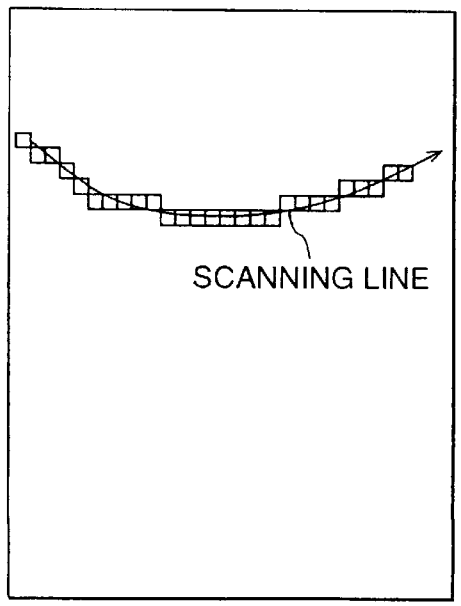
FIG. 7 is a view illustrating the correcting action of a vertical-scanning positional-deviation correcting section according to the present invention.

By such a vertical scanning positional-deviation correction process, for example, even if a scanning line on a recording pager is distorted by the image recording section 19 as shown in FIG. 7, the picture element data of the picture element expressed by the sign □ in the image memory 10 are sequentially read out, so that the information of each picture element is recorded at a position to be originally recorded in the image recording section 19, regardless of the distortion of the scanning line. Furthermore, in FIG. 7, the scanning line on the recording paper and the picture element in the image memory 10 are drawn at the same position for convenience.

The vertical scanning density-deviation correcting section 103 will be described below.

Although the correction of positional deviation in the vertical scanning direction of the scanning line is performed by the vertical scanning positional-deviation correction section 102 as mentioned above, this correction of positional deviation in the vertical scanning direction is merely performed every one picture element. For that reason, although the positional deviation of the scanning line is smooth, the picture point is shifted by one picture element in the actual recorded image. That is, in a region wherein the positional deviation amount Δy in the vertical scanning direction of the scanning line varies, an image pattern wherein the original image is shifted along the transition point is recorded.

For example, assuming that the positional deviation amount indicative signal in the vertical scanning direction of each picture element is as shown in FIG. 8A, and that the original image signal is as shown in FIG. 8B, the image signal as shown in FIG. 8C is outputted by the correction of positional deviation by means of the vertical scanning positional-deviation correction section 102. The picture elements indicated by broken lines in FIGS. 8B and 8C represent black picture elements, and the other elements represent white picture elements. As shown in these figures, in the region (P0) wherein the amount Δy of positional deviation in the vertical scanning direction decreases, one black picture element of the original image signal is converted into two black picture elements in the image signal after the correction of vertical scanning positional-deviation, so that the density increases. In addition, in the region (P1) wherein the amount Δy of positional deviation in the vertical scanning direction increases, the information on the black picture elements of the original image signal disappear in the image signal after the correction of vertical scanning positional-deviation, so that the density decrease. While the case that the picture elements at the transition point is black picture elements has been described, in the case of white picture elements, the density also varies although the increase and decrease of the density are reversed. Moreover, near the region (P2) wherein Δy varies in the horizontal scanning direction, the pixel pattern of the image signal after the correction of vertical scanning positional-deviation varies. Therefore, when the recording is performed by using the image signal after the correction of vertical scanning positional-deviation as the recording signal, the density deviation of the recorded image occurs. In particular, in a pseudo tone image wherein tone is expressed in the ratio of the black picture elements in the recorded image by the error diffusion method or the dither method, or in a binary image of a thin line and so forth, this density variation has a great influence on the picture quality.

Moreover, in region P2 of FIG. 8A, the black and white pattern changes from one pattern as shown in FIG. 9A to another pattern as shown in FIG. 9B by the correction of positional deviation by means of the vertical scanning positional-deviation correcting section 102. In an usual image recording system, the density of the pattern of FIG. 9A is different from that of FIG. 9B. For example, in the electrophotographic system, the density of FIG. 9A is higher than that of FIG. 9B.

On the other hand, in the error diffusion image, the pattern wherein the number of the adjacent picture elements is small as shown in FIG. 9A occurs greatly, and in the concentrated dither image, the pattern wherein the number of the adjacent picture elements is great as shown in FIG. 9B occurs greatly. For that reason, at the transition point wherein the amount Δy of positional deviation in the vertical scanning direction varies in the horizontal scanning direction, the frequency in occurrence of the variation into the low-density pattern increases in the case of the error diffusion image, and the frequency in occurrence of the variation into the high-density pattern increases in the case of the dither image. Therefore, along the transition points of Δy in the horizontal scanning direction, string-line noises having different densities occur.

This example has been described as an example of the case that the original image signals are binary signals of white and black. However, in the case of multi-level signals, the same density fluctuation occurs in accordance with the correction of positional deviation in the vertical scanning direction although it is smaller than the case of binary signals.

The vertical scanning density-deviation correcting section 103 is provided for correcting the density deviation produced by the aforementioned correction of vertical scanning positional deviation. Specifically, in the region wherein the value Δy of the positional deviation in the vertical scanning direction around the picture element to be noticed, the density deviation is predicted in accordance with the pixel pattern of an image signal and the amount Δy of the positional deviation, and the correction of the density deviation is performed on the basis thereon. The vertical scanning density-deviation correcting section 103 comprises a line delay 131, a pixel delay 132, a comparator 133, a pixel delay group 134 and a density correction circuit 135.

The vertical scanning positional-deviation amount indicative signals 160 from the positional-deviation amount indicative signal producing section 101 are inputted to the line delay 131 and the pixel delay 132, and the respective signals are delayed by one line and one picture element, respectively. The comparator 133 outputs differential signals Δy1 and Δy2 between the signal after and before being delayed by the line delay 131 and the pixel delay 132. These differential signals Δy1 and Δy2 represent the presence of a picture element wherein the spacial variation of the positional-deviation amount indicative signal 160 occurs, and the amount of the variation. That is, a first detecting means for detecting a picture element wherein the spacial variation of the positional-deviation amount indicative signal 160 occurs, is formed by the line delay 131, the pixel delay 132 and the comparator 133.

On the other hand, the image signals 162 through 164 after the correction of positional deviation in the vertical scanning direction, which are supplied from the vertical scanning positional-deviation correcting section 102, are delayed by the pixel delay group 134, so that a pixel pattern of 3×3 picture elements around the picture element of the coordinate (x, Y+Δy) to be noticed, is detected. That is, a second detecting means for detecting a pixel pattern around the picture element to be noticed in the image signal, is formed by the pixel delay group 134.

The density correction circuit 135 inputs the signal representative of the pixel pattern of 3×3 picture elements detected by the pixel delay 134, and the differential signals Δy1 and Δy2 outputted from the comparator 133, to correct the density of the image signal at the position corresponding to the picture element to be noticed, to output an image signal 165 wherein the density deviation in the vertical scanning direction produced in the vertical scanning positional-deviation correcting section 102 is corrected. That is, the density correction circuit 135 comprises, for example, a ROM or a programmable logic array, and outputs an image signal wherein the density deviation in the vertical scanning direction is corrected in accordance with the inputted differential signals Δy1 and Δy2 and the inputted image signal of the pixel pattern of 3×3 picture elements. The relationship between them is shown in TABLE 1. However, in TABLE 1, Q1 through Q8 represent the image signal values of the coordinates (x−1, y+Δy−1), (x, y+Δy−1), (x+1, y+Δy−1), (x−1, y+Δy+1), (x, y+Δy), (x+1, y+Δy), (x−1, y+Δy+1), (x, y+Δy+1) and (x+1, y+Δy+1), i.e.. the pixel pattern of 9 picture elements around the picture element to be noticed in the image signal.

comprising the line delay 131, the pixel delay 132 and the comparator 133, and when the pixel pattern of the picture element to be noticed, which has been detected by the second detecting means comprising the pixel delay group 134, is coincide with a preset pixel pattern, the density correction corresponding to the set of the coincident pixel pattern and the picture element having the spacial variation is performed with respect to the image signal Q4 of the picture element to be noticed, to correct the density.

Furthermore, in the cases of terms #1, #6 and #9, there is no fluctuation in the pixel pattern, or the density fluctuation is small even if there is a fluctuation in the pixel pattern. Therefore, in these cases, the density correction is not performed. In addition, terms #10 through #13 correspond to the cases that the amount Δy of positional deviation in the vertical scanning direction varies in the adjacent picture elements by two picture elements or more. However, since the spacial variation of Δy is usually small, these terms are scarcely applied, so that there is no great problem by the aforementioned assignment. Moreover, if the processing wherein the fluctuation of a pixel pattern of two picture elements or more is taken into consideration is assigned to term #6, the aforementioned problem can be solved.

By such a processing in the vertical scanning density-deviation correcting section 103, a four-level image signal 165 wherein the density deviation caused by the variation of the pixel pattern due to the correction of positional deviation by the vertical scanning positional-deviation correcting section 102 is corrected, is outputted.

The horizontal scanning positional-deviation/density-deviation correcting section 104 will be described below.

The horizontal scanning positional-deviation/density-deviation correcting section 104 corrects the positional deviation in the horizontal scanning direction of the four-level image signal 165 outputted from the vertical scanning density-deviation correcting section 103, using the horizontal scanning positional-deviation amount indicative signal 159, converts the image signal into a pulse-width modulation signal, and performs the correction of density deviation in the horizontal scanning direction, to output a recording

TABLE 1

| Terms | Δy1 | Δy2 | Q0 | Q1 | Q2 | Q3 | Q4 | Q5 | Q6 | Q7 | Q8 | Output signal |
|---|---|---|---|---|---|---|---|---|---|---|---|---|
| #1 | 0 | 0 | * | * | * | * | * | * | * | * | * | Q4 |
| #2 | 1 | * | * | * | * | * | * | * | * | * | * | 0.5 × Q4 + × Q1 |
| #3 | −1 | * | * | * | * | * | * | * | * | * | * | 0.5 × Q4 + × Q1 |
| #4 | 0 | 1 | | | 1 | 1 | | 0 | | | | Q4 + 0.25 |
| #5 | 0 | 1 | | | 1 | 0 | | 1 | | | | Q4 − 0.25 |
| #6 | 0 | 1 | | | other than the above | | | | | | | Q4 |
| #7 | 0 | −1 | 0 | | | | | | 1 | 1 | | Q4 + 0.25 |
| #8 | 0 | −1 | 1 | | | | | | 1 | 0 | | Q4 − 0.25 |
| #9 | 0 | −1 | | | | | other than the above | | | | | Q4 |
| #10 | ≦−2 | * | * | * | * | * | * | * | * | * | * | Q4 |
| #11 | ≧2 | * | * | * | * | * | * | * | * | * | * | Q4 |
| #12 | * | ≦−2 | * | * | * | * | * | * | * | * | * | Q4 |
| #13 | * | ≧2 | * | * | * | * | * | * | * | * | * | Q4 | where, *: optional value

In TABLE 1, term #2 corresponds to region P0 in FIG. 8A, term #3 corresponds to region P1 in FIG. 8A, and terms #4, #5, #7 and #8 correspond to region P2 in FIG. 8A. By performing the correction under these conditions as shown in TABLE 1, the density deviation in the vertical scanning direction due to the fluctuation of the pixel pattern is corrected. That is, when the picture element wherein the spacial variation occurs in the positional-deviation amount indicative signal 160, is detected by the first detecting means image signal 170. In the horizontal scanning direction unlike the vertical scanning direction, one picture element can be optionally divided, so that the correction can be performed every a smaller unit than one picture element. In this preferred embodiment, this correction is performed every ⅓ picture element. Therefore, it is assumed that the horizontal scanning positional-deviation amount indicative signal 159 is also a signal having a quantized unit of ⅓ picture element.

The horizontal scanning positional-deviation/density-deviation correcting section 104 comprises a subtracter 141, a pair of line memories 142, a pixel delay 143, a comparator 144, a pixel delay 145, a density correction circuit 146 and a change-over switch 147. The subtracter 141 subtracts the horizontal scanning positional-deviation amount indicative signal 159 from the horizontal scanning address signal 153, to output a line memory address signal 166. Specifically, the subtracter 141 subtracts the horizontal scanning positional-deviation amount indicative signal 159 from a value obtained by multiplying the value of the horizontal scanning address signal 153 by 3, since the horizontal scanning address signal 153 is a signal having a picture element as an unit, whereas the horizontal scanning positional-deviation amount indicative signal 159 is a signal having three picture elements as an unit. Therefore, the line memory address signal 166 outputted from the subtracter 141 is also a signal having ⅓ picture element as an unit.

The line memory address signal 166 is supplied to the pair of line memories 142 as an address input. The pair of line memories 142 serves to convert the image signal outputted from the vertical scanning density-deviation correcting section 103, into a pulse-width modulation signal. The pair of line memories 142 comprises two line memories, each having a capacity three times as large as the number of picture elements in the horizontal scanning direction, and each having a width of 1 bit. The image signal 165 outputted from the vertical scanning density-deviation correcting section 103 is expanded to a pulse-width modulation signal to be written in four practice elements after the address expressed by the line memory address signal 166 of the line memory row 142. That is, assuming that the value (pulse-width) of the recording signal 170 is d ($0 \leqq d < 4$), "1" is written in the addresses AD through AD+d−1 expressed by the line memory address signal 166, and "0" is written in the addresses AD+d through AD+3.

As a result, assuming that the value of the horizontal scanning address signal 153 is x and the value of the vertical scanning address signal 154 is y, the image signal of the coordinate (x, y+Δy) in the image memory 10 is outputted as a recording signal of coordinate (x−Δx, y) on a distorted scanning line in the recorded image. Since the value of the positional-deviation Δx in the horizontal scanning direction of a scanning line forming a recorded image is small, and since the spacial variation thereof is also small, it may be considered that the image signal of the coordinate (x+Δx, y+Δy) in the image memory 10 is outputted as the recording signal corresponding to the coordinate (x, y) on the distorted scanning line. By repeating such an operation with respect to each picture element in the horizontal scanning direction, the pulse-width modulation signal wherein the positional deviation in the horizontal scanning direction is corrected is formed on the line memory row 142.

In the line memory row 142, the writing and reading are alternately performed every scanning of 1 raster of the recorded image, and a recording signal 170 is continuously outputted. That is, while the writing is performed in one line memory of the line memory row, a signal of a picture element expressed by the horizontal scanning address signal 153 is read out of the other line memory, so that the recording signal 170 outputted to the image recording section 19 is formed. The change-over switch 147 is provided for taking out the output signal of the line memory of the read-out mode of the line memory row 142, as the recording signal 170.

In this way, the positional deviation in the horizontal scanning direction is corrected by converting the image signal 165 into the pulse-width modulation signal in the pair of line memories 142, and by correcting the pulse-width modulation signal by the line memory address signal 166 produced by the subtracter 141 on the horizontal scanning positional-deviation indicative signal 159.

When such a correction of the horizontal-scanning positional-deviation is simply performed, the density fluctuation occurs at the picture element wherein the amount Δx of the horizontal-scanning positional deviation varies, similar to the correction of the positional deviation in the vertical scanning direction performed by the vertical-scanning positional-deviation correcting section 102.

FIGS. 10(a) through 10(c) show examples of image signals 165 inputted to the horizontal-scanning positional-deviation/density-deviation correcting section 104, and image signals after the horizontal-scanning positional-deviation correction. In these examples, one blank picture element occurs at point (Q0) wherein the amount Δx of the horizontal-scanning positional deviation increases in the horizontal scanning direction, and data of two picture elements are overlapped with each other at point (Q1) wherein Δx decreases in the horizontal scanning direction. In the former case, the value of the recording signal must be defined in the blank picture element, and in the latter case, it is required to determine as to which of the overlapped data are outputted as the recording signal.

Since the correction unit in the horizontal scanning direction is small in the case of the correction of positional deviation in the horizontal scanning direction, the variation of the amount of positional deviation in the vertical scanning direction has no great influence on the picture quality. Therefore, in this preferred embodiment, the correction of positional deviation is performed at only the point wherein the amount Δx of positional deviation in the horizontal scanning direction varies in the horizontal scanning direction. That is, in this preferred embodiment, the horizontal-scanning positional-deviation indicative signal 159 is inputted to the pixel delay 143, and the difference between the signal 159 and the signal of the last picture element is calculated by the comparator 144, so that a positional-deviation amount differential signal 167 is derived. The image signal 165 is also inputted to the pixel delay 145. The current image signal 168 and the image signal 165 of the last picture element which are outputted from the pixel delay 145, and the positional-deviation differential signal 167 are inputted to the density correction circuit 146.

The correction circuit 146 performs the following processing when the positional-deviation amount differential signal 167 is not 0, i.e.. at the point wherein the horizontal-scanning positional-deviation amount indicative signal 159 varies. That is, when the positional-deviation amount differential signal 167 is "1" or "−1", two processings are switched in accordance with the polarity thereof. When the positional-deviation amount differential signal 167 is "1", the patterns of the signals of the last and next picture elements of the overlapped picture element are compared. If the sum of these signals is greater than 4, "1" is written in the address AD+4 of the line memory row 142, and if it is smaller than 4, "0" is written therein. In addition, when the positional-deviation amount indicative signal 167 is "1−1", the patterns of the signals of the last and next picture elements of the blank picture element are compared. If the sum of these signals is greater than 4, "1" is written in the address AD+3 of the line memory row 142, and if it is smaller than 4, "0" is written therein. By such processing, the density deviation in the horizontal scanning direction can e effectively decreased.

The recording signal 170 thus obtained by the processing at the positional-deviation/density-deviation correcting section 11 through 14 is outputted to the image recording section 19, so that it is possible to record a color image which has no color-deviation noise and no density fluctuation.

Other preferred embodiments of the present invention will be described blow.

(Second Preferred Embodiment)

Figure 12:
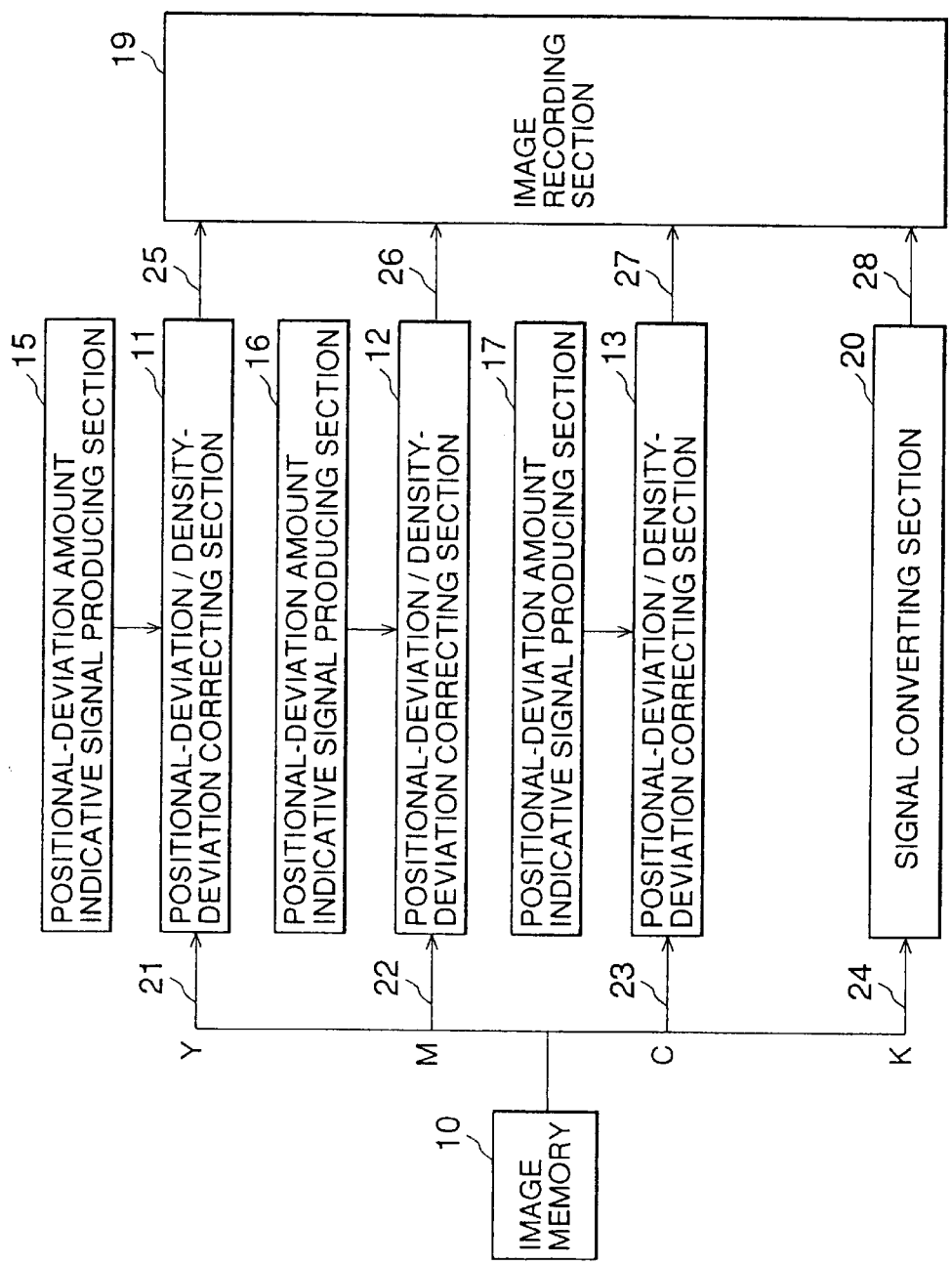
FIG. 12 is a block diagram of the second preferred embodiment of a color image recording system according to the present invention.

FIG. 12 is a schematic block diagram of the second preferred embodiment of a color image recording system. As can be clearly seen from the comparison with FIG. 1 showing the first preferred embodiment of the present invention, the color image recording system in this preferred embodiment is provided with positional-deviation/density-deviation correcting section 11 through 13 corresponding to only image signal 21 through 23 for yellow, magenta and cyan, out of the image signal 21 through 24 for yellow, magenta, cyan and black outputted from the image memory 10. This preferred embodiment is different from the first preferred embodiment at the point that the image signal 24 for black is inputted to the image recording section 19 as a recording signal 28 after being directly converted into a pulse-width modulation signal by the signal converting section 20.

Out of color image recording systems, in a color image recording system for recording a color image by toners or inks of four colors including black in addition to yellow, magenta and cyan, the black is mainly used for recording characters. In the character portion required to be more minute than the image portion such as an usual half tone, when the correction of positional deviation of the scanning line is also preformed with respect to the black image similar to the first preferred embodiment, the quality of the recorded image is deteriorated if a jag is produced by the correction of positional deviation. According to this preferred embodiment, since the correction of positional deviation of the scanning line is not performed with respect to black, it is possible to improve the recording quality of the character portion. In addition, if the correction of positional deviation of the scanning line is not performed with respect to black, the characters or the like are independent from the image portion to have no influence on the color reproducibility of the color image, so that the problem of color deviation can be eliminated by correcting the positional deviation of the scanning line with respect to only yellow, magenta and cyan.

In addition, in the first preferred embodiment, the amount ($\Delta x$, $\Delta y$) of positional deviation of the scanning line for each color of yellow, magenta, cyan and black is obtained by the difference between the ideal scanning line and the actual scanning line. However, the positional deviation of the scanning line for each color has little influence on the picture quality, and it is not always necessary to correct the positional deviation of the scanning line every color. Therefore, by using the amount of positional deviation of the scanning line of the recorded image of, for example, black as a reference, the amount of relative positional deviation of the scanning line of the recorded images of yellow, magenta and cyan with respect to the reference may be used as the amount ($\Delta x$, $\Delta y$) of positional deviation. In this case, the correction of positional deviation with respect to the image signal of black may be omitted as the second preferred embodiment.

(Third Preferred Embodiment)

Figure 13:
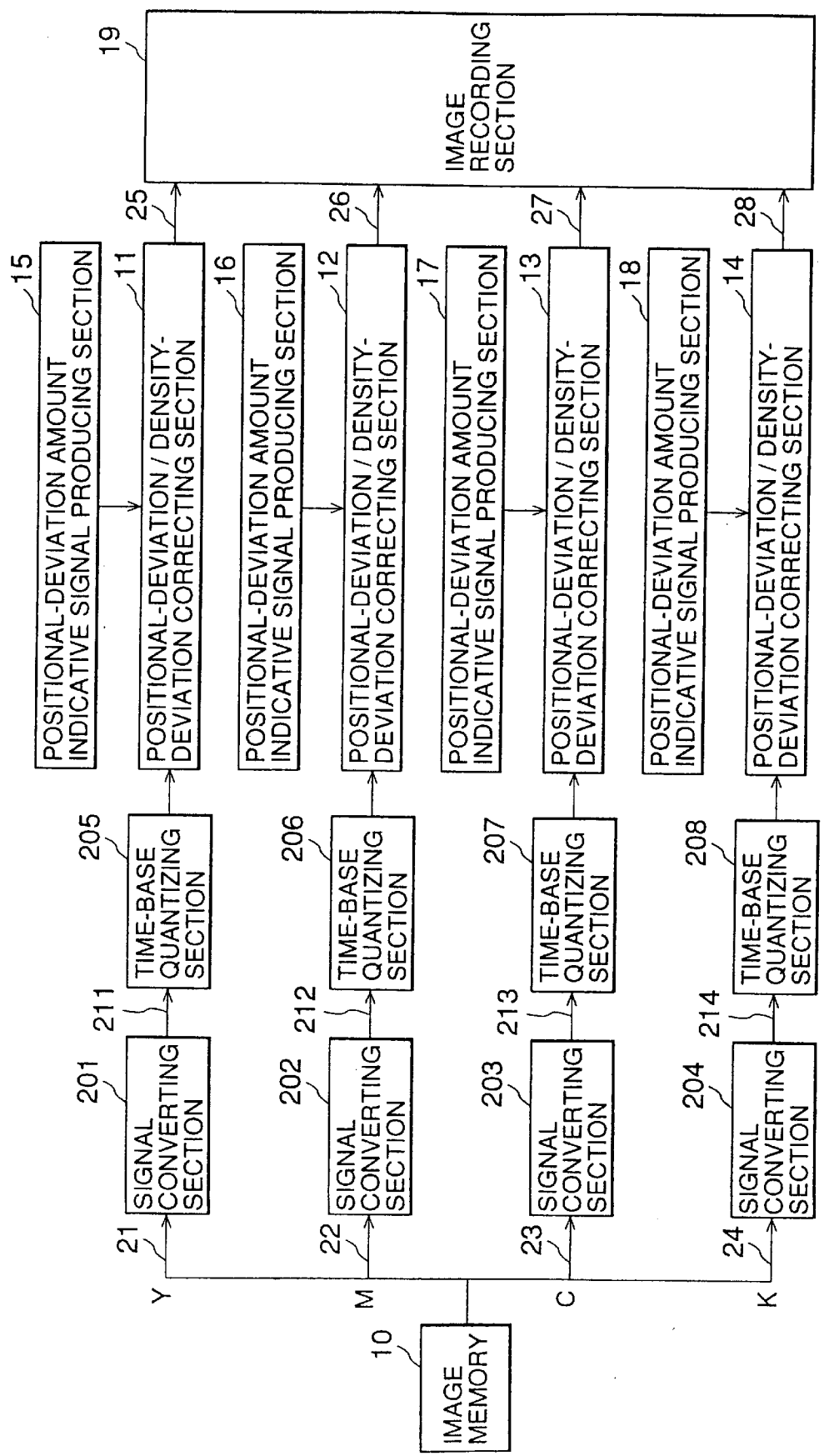
FIG. 13 is a block diagram of the third preferred embodiment of a color image recording system according to the present invention.

FIG. 13 is a block diagram of the third preferred embodiment of a color image recording system according to the present invention. While the correction of positional-deviation/density-deviation of the scanning line forming the recorded image has been performed with respect to the digital image signal read out of the image memory 10 in the first and second preferred embodiments, the correction of positional-deviation/density-deviation of a scanning line may be performed with respect to an analog image signal comprising a pulse-width modulation signal having a pulse-width of tone data.

In this preferred embodiment, the correction of positional-deviation/density-deviation of a scanning line is performed with respect to an image signal comprising a pulse-width modulation signal. Image signals 21 through 24 for yellow, magenta, cyan and black read out of the image memory 10 are respectively converted, by signal converting sections 201 through 204, into pulse-width modulation signals 211 through 214 for tone processing which expresses the density by area. The pulse-width modulation signals are generally used as a recording signal which controls the on-off of a laser beam in a printer of the electrophotographic system which scans by the laser beam.

The pulse-width modulation signals 211 through 214 are sampled by a sampling clock of predetermined intervals by means of time-base quantizing sections 205 through 206 serving as first signal converting means, to be quantized in the time axis direction, and converted into a digital signal row (a digital image signal) to be inputted to the positional-deviation/density-deviation correcting sections 11 through 14. The constructions of the positional-deviation/density-deviation correcting sections 11 through 14 and the positional-deviation amount indicative signal producing sections 21 through 24 are the same as those of the first preferred embodiment. Recording signals 25 through 28 wherein the positional deviation and the density deviation of the scanning line of the recorded image have been corrected, are supplied from the positional-deviation/density-deviation correcting sections 11 through 14 to the image recording section 19 to record a color image.

Furthermore, in this case, in the internal section of the positional-deviation/density-deviation correcting sections 11 through 14, for example, in the horizontal-scanning positional-deviation/density-deviation correcting section 104 as shown in FIG. 11, the digital image signal is converted to be returned to a pulse-width modulation by the line memory row 142 corresponding to second signal converting means.

According to this preferred embodiment, the positional-deviation/density-deviation correcting sections 11 through 14 for performing the processing depending upon the positional-deviation characteristic of the scanning line at the image recording section 19, and the recording section 19 can be separated from the signal converting sections 201 through 204 for performing the processing independent of the positional-deviation characteristic of the scanning line, so that it is possible to easily design an image recording system. In addition, since the smoothing processing for causing characters to have a high picture quality can be particularly performed by the signal converting sections 201 through 204 independent of the processing in the positional-deviation/density-deviation correcting sections 11 through 14, there is an advantage in that the signal converting sections 201 through 204 can be easily designed.

(Fourth Preferred Embodiment)

Figure 14:
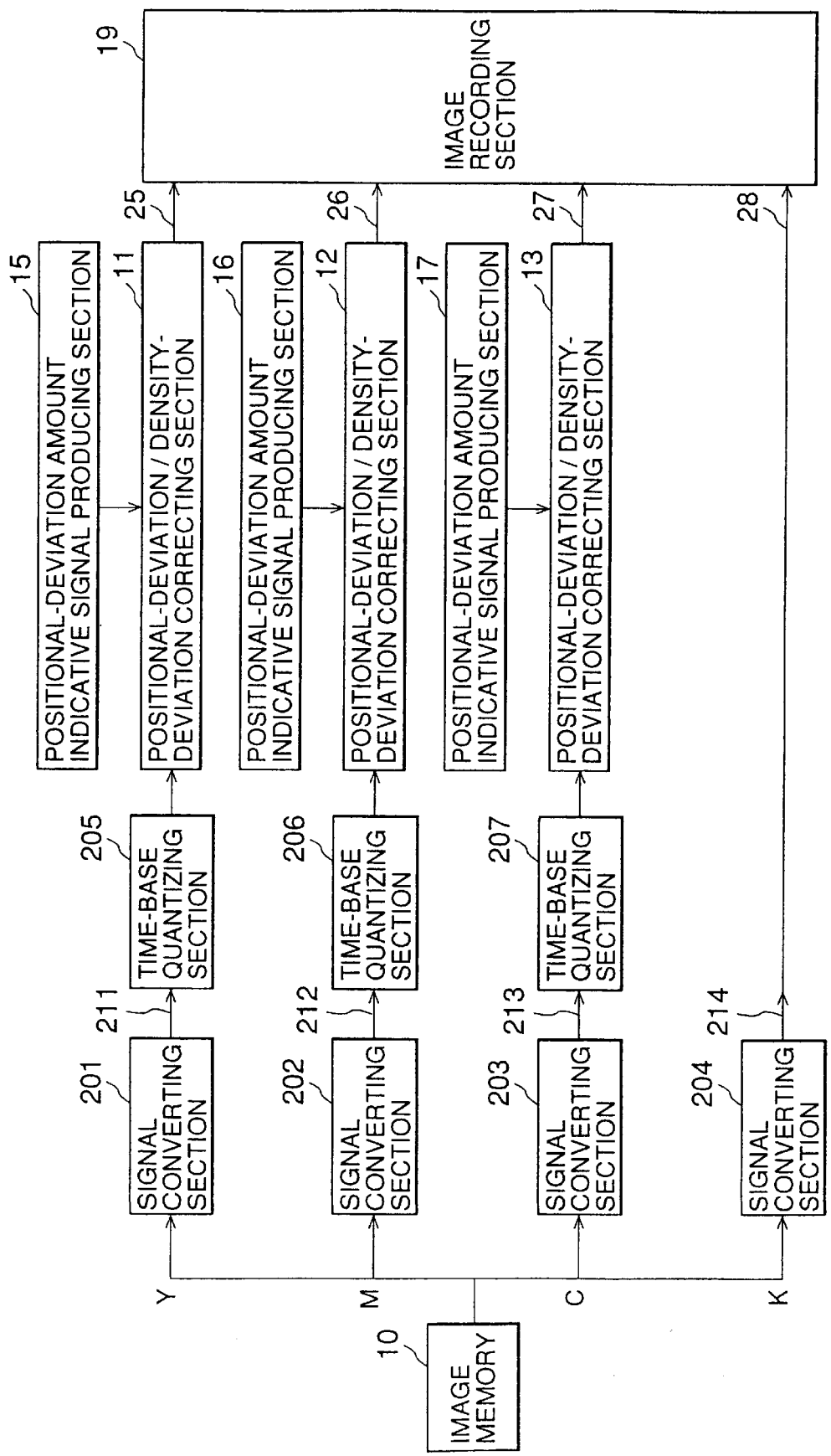
FIG. 14 is a block diagram of the fourth preferred embodiment of a color image recording system according to the present invention.

FIG. 14 is a block diagram of the fourth preferred embodiment of a color image recording system according to the present invention. In this preferred embodiment, the positional-deviation/density-deviation correcting section 14 with respect to the pulse-width modulation signal 214 corresponding to the black image signal in the third preferred embodiment is omitted, and the pulse-width modulation signal 214 is directly supplied to the image recording section 19 as the black recording signal 28. The advantageous effects thereof are the same as those of the second preferred embodiment.

The present invention can be practiced by various modifications. For example, while the same correction parameter with respect to the image signals for yellow, magenta, cyan and black and the pulse-width modulation signals has been used in the positional-deviation/density-deviation correcting sections 11 through 14 in the aforementioned preferred embodiments, the same correction parameter may not always be used. In particular, when the relationship between the recording pattern and the density varies in accordance with the characteristic of toners and inks of yellow, magenta, cyan and black, it is desired that correction parameters particularly suitable for the characteristics of the respective colors are used.

The present invention can also be applied to the correction of positional deviation of a scanning line in a monochromatic image recording system, and to the correction of density deviation in accordance therewith.

In addition, while the correction of positional deviation in the horizontal and vertical scanning direction of a scanning line forming a recorded image and the correction of density deviation in accordance therewith have been performed in the aforementioned preferred embodiments, the corrections of positional deviation and density deviation in the horizontal scanning direction may be omitted when the positional deviation in the horizontal scanning direction has no practical problem.

Moreover, while the pixel pattern of the image signal after the correction of positional deviation by the vertical-scanning positional-deviation correcting section 102 has been detected to correct the image signal in the vertical-scanning density-deviation correcting section 103 in FIG. 11, the detection of the pixel pattern may be performed by the image signal inputted through the signal line 161.

Referring to FIGS. 15 through 33, the fifth through sixteenth preferred embodiments of a color-deviation detection for the correction of the aforementioned color deviation will be described below.

(Fifth Preferred Embodiment)

FIG. 15 is a view illustrating a recording method for the color-deviation detection in the fifth preferred embodiment. As shown in this figure, in this preferred embodiment, a superposed pattern P03 is obtained by recording the superposition of first and second patterns P01 and P02 of different colors. The first pattern P01 is a pattern of black as a reference, an the second pattern P02 is a pattern of chromatic color, for example, a pattern of magenta, which is an object of the detection of relative positional deviation with respect to the first pattern.

First, for example, the first pattern P01 is recorded using a color printer, and the second pattern P02 is superposed thereon to be recorded. In the figure, in order to facilitate to understand this preferred embodiment, the first and second pattern P01 and P02 are extended in the right and left directions, and offset in the upward and downward directions. In practice, they are superposed at the same position in the upward and downward directions to be recorded, as illustrated by the superposed pattern P03. In a color printer, the right and left directions correspond to the horizontal scanning directions (the directions of arrow X in the figure), and the upward and downward directions correspond to the vertical scanning directions (the directions of arrow Y in the figure).

The first and second patterns P01 and P02 are the same pattern, and a repeated periodic pattern. In this preferred embodiment, the M-sequence pattern of a period of 7 is used as this periodic pattern. This pattern comprises a repeated pattern of 0001101 assuming that the recorded picture element is 1 and the non-recorded picture element is 0.

In FIG. 15(a), the first and second patterns P01 and P02 are superposed without relative positional deviation in the horizontal scanning direction to be recorded. Assuming that the color of the first pattern is black and the color of the second pattern is magenta, when both patterns P01, P02 are completely superposed, all of the superposed patterns P03 are non-chromatic color (gray).

Then, assuming that the first pattern P01 is offset from the second pattern P02 by a picture element as shown in FIG. 15(b), two picture elements per a period in the second pattern P02 are recorded at positions which are different from the picture element of black in the first pattern P01, so that magenta appears at only two picture elements per a period in the superposed pattern P03.

In FIG. 15(c), the first pattern P01 is offset from the second pattern P02 by two picture elements to the right. In this case, two picture elements per a period are also recorded at positions which are different from the picture element of black in the first pattern P01, so that magenta appears at only two picture elements per a period in the superposed pattern P03.

Similarly, when the first pattern P01 is offset from the second pattern P02 by two or three picture element to the right as shown in FIGS. 15(d) and 15(e), two picture elements per a period are recorded at positions which are different from the picture element of black in the first pattern P01, so that magenta appears at only two picture elements per a period in the superposed pattern P03.

Figure 16:
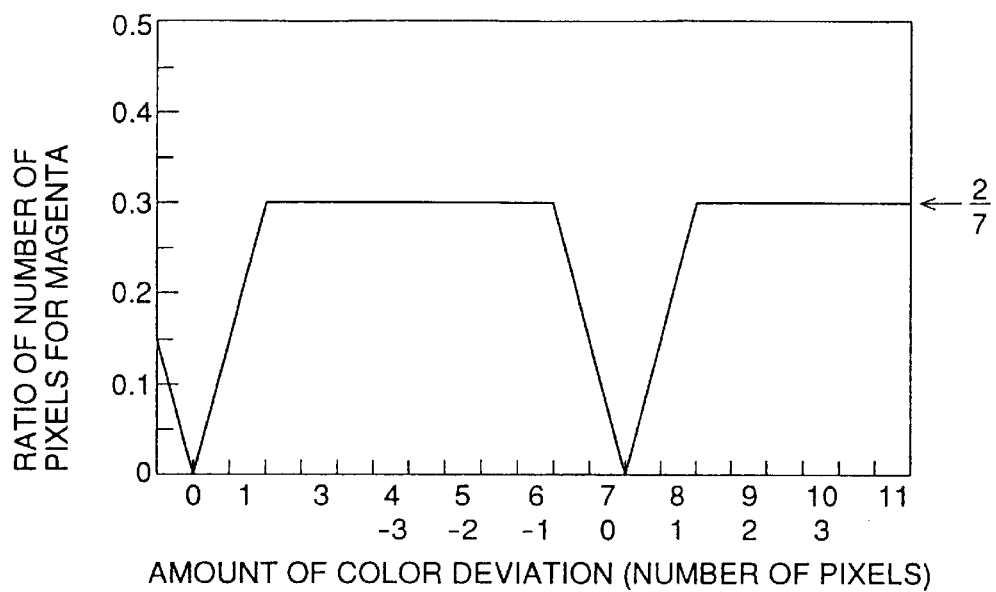
FIG. 16 is a graph showing the relationship between the amount of the color deviation per in a period and the ratio of the number of picture elements of chromatic colors which do not overlap with a reference pattern, in the fifth preferred embodiment.

FIG. 16 is a graph wherein the axis of abscissa expresses the relative positional deviations (the amounts of color deviation) between the first and second patterns P01 and P02 as the number of picture elements, and the axis of ordinate expresses the ratios of the number of picture elements of magenta itself (the picture elements of magenta not superposed on the picture element of black) per a period in the superposed pattern P03.

In the superposed pattern P03, a constant amount (in this example, two picture elements) of picture elements of magenta being chromatic color appears except for the point wherein the first pattern P01 is coincident with the second pattern P02 and for the point wherein the first pattern P01 is offset from the second pattern P02 by a period to be coincident therewith. Therefore, according to this preferred embodiment, it is possible to easily recognize the relative positional deviation between the first and second patterns P01 and P02, i.e.. the presence of color deviation, with the naked eye without the need of a microscope, on the basis of the determination as to whether the superposed pattern P03 appears to be only non-chromatic color, or a color including a chromatic color.

(Sixth Preferred Embodiment)

In this preferred embodiment, first, as a first pattern 311 as shown in FIG. 17(a), a plurality of unit patterns 301 through 307, each of which includes a plurality of straight lines extending in the horizontal scanning line, and wherein the phase (relative phase) of a unit pattern is offset from that of the adjacent unit pattern by one picture element in the vertical scanning direction in the range of from—three picture elements to three picture elements, are arranged in the horizontal scanning direction to be recorded by a first color (for example, black being a non-chromatic color).

Figure 17:
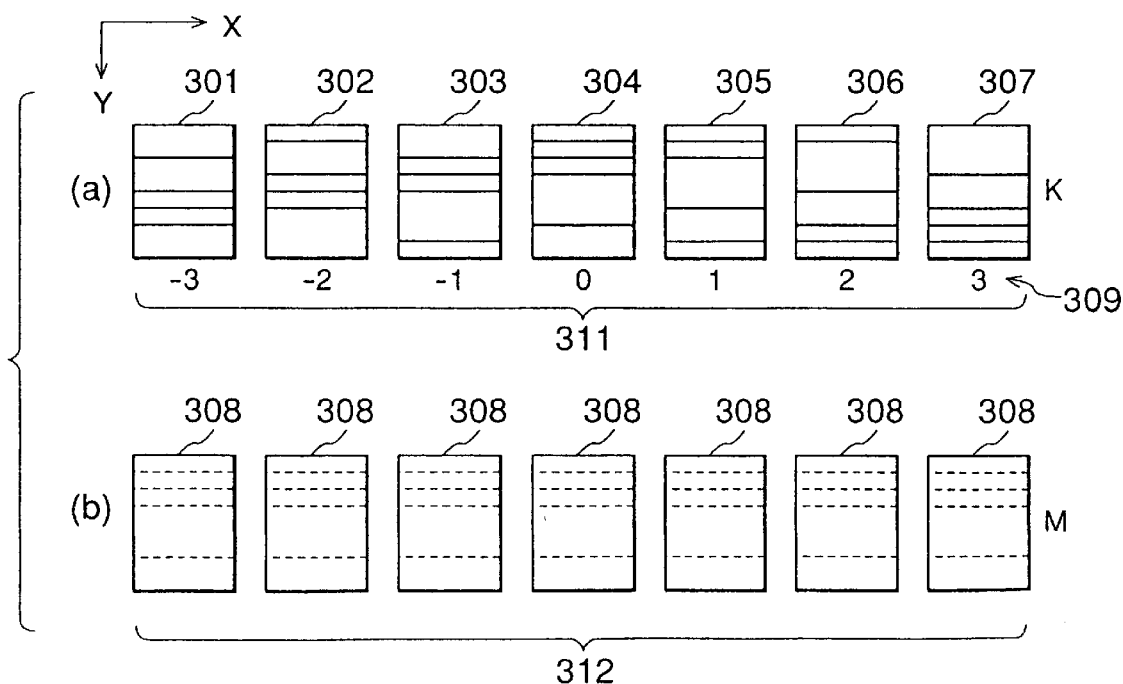
FIG. 17 is a view illustrating first and second patterns for detecting the color deviation in the sixth preferred embodiment according to the present invention.

Then, as a second pattern 312 as shown in FIG. 17(*b*), a plurality of unit patterns 308 which are the same to have no phase shift in the vertical direction, are arranged in the horizontal scanning direction to be superposed on the first patterns 301 through 307 by a second color (for example, magenta being a chromatic color) to be recorded.

Moreover, near the unit pattern 301 through 307 forming the first pattern 311, color-deviation indications 309 indicating, by numbers of −3 to +3, the number of picture elements, by which each of the unit patterns 301 through 307 is offset from the position of the central unit pattern 304 serving as a reference (0) in the vertical scanning direction, are printed.

Furthermore, the patterns are rough since FIG. 17 is schematically illustrated. However, since the size of one picture element is about 42 $\mu$m, for example, in a color printer having a resolution of 600 dpi, the size of a period of the pattern is about 0.249 mm when the first and second patterns 311 and 312 are patterns having a period of seven picture elements. Therefore, assuming that the whole area of each of the first and second patterns 311 and 312 is, for example, about 3 mm, they usually appear as gray patterns with the naked eye. In this case, in the superposed pattern of the first and second patterns 311 and 312, if the pattern at the position having a color-deviation indication 309 of "0" appears to be a non-chromatic color and the other patterns appear to be magenta, it can be recognized that the amount of color deviation is 0, i.e.. there is no color deviation. In addition, in the superposed pattern, if the pattern at the position having a color-deviation indication 309 of "−3" appears to be a non-chromatic color, it can be easily recognized that the amount of color deviation is −3 picture elements.

In this way, according to this preferred embodiment, it is possible to easily recognize the amount of color deviation, not only the presence of color deviation, with the naked eye.

(Seventh Preferred Embodiment)

Figure 18:
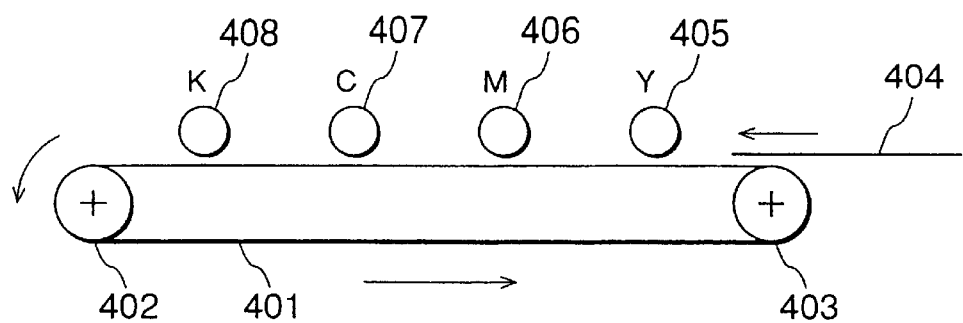
FIG. 18 is a schematic view of a recording system of an electrophotographic color printer of a 4-drum and 1-path system, which illustrates the seventh preferred embodiment according to the present invention.
Figure 19:
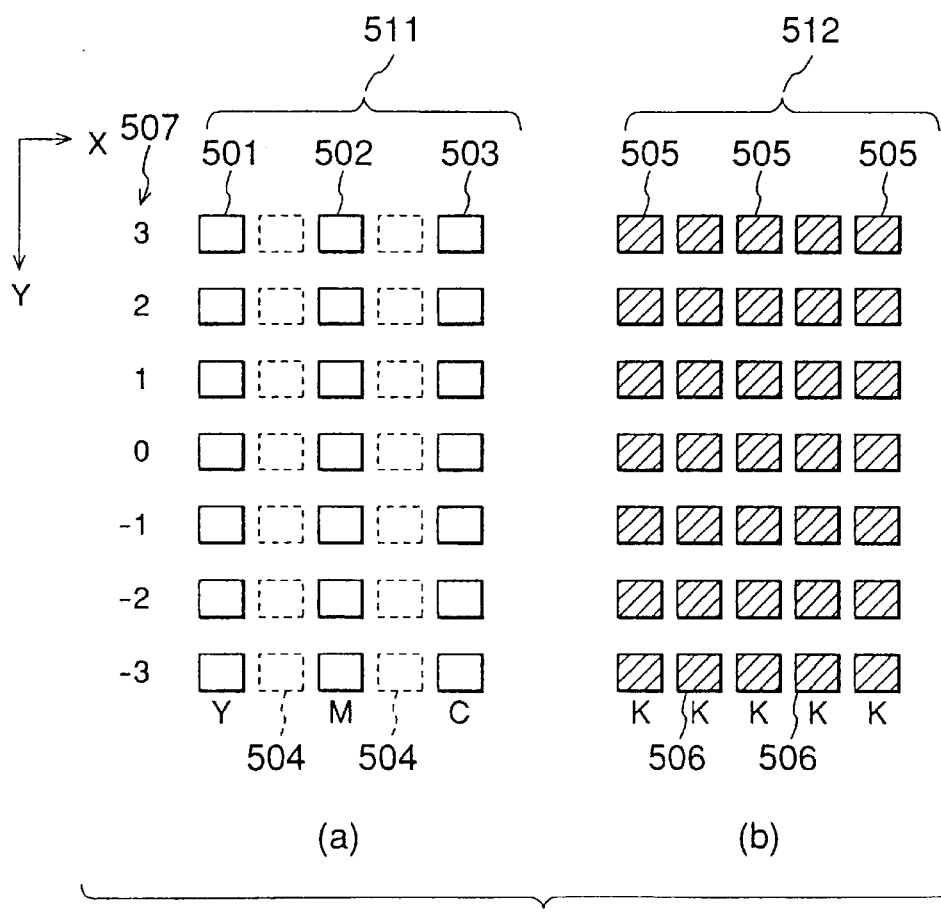
FIG. 19 is a view illustrating first and second patterns for detecting the color deviation in the seventh preferred embodiment.

Referring to FIGS. 18 and 19, the seventh preferred embodiment of the present invention will be described. FIG. 18 schematically illustrates a recording system of an electrophotographic color printer of 4-drum, 1-pass system. When a carrier/transfer belt 401 is moved in the direction of the arrow by means of driving rollers 402 and 403, a recording paper 404 is supplied from the right side of the figure, and the recording is performed on the recording paper 404 in the order of a yellow (Y) recording system 405, a magenta (M) recording system 406, a cyan (C) recording system 407 and a black (K) recording system 408.

With this construction, as shown in FIG. 19, color-deviation detecting patterns 501, 502 and 503 for yellow, magenta and cyan are first recorded as a first pattern 511, using the yellow recording system 405, the magenta recording system 406 and the cyan recording system 407. Similar to the first pattern 311 as shown in FIG. 17, each of these color-deviation detecting patterns 501, 502 and 503 for yellow, magenta and cyan comprises a plurality of unit patterns wherein the phase is shifted in the horizontal scanning direction in the range of from −3 to +3. These unit patterns are so arranged to extend in the direction perpendicular to the first pattern 311 of FIG. 17, i.e.. in the vertical scanning direction. In addition, it is assumed that a plurality of straight lines within each of the unit patterns extends in the vertical scanning direction.

Moreover, near each of the unit patterns forming the color-deviation detecting patterns 501, 502 and 503 for yellow, magenta and cyan, color-deviation amount indications 507 indicating, by the numbers of −3 to +3, the number of picture elements, by which each of the unit patterns is offset from the position of the central unit pattern serving as a reference (0) in the vertical scanning direction, are printed.

Then, similar to the second pattern 312 of FIG. 17, as a second pattern 512 as shown in FIG. 19, the same black pattern 505 which has no phase shift in the vertical scanning direction, is superposed on the first pattern 511 using the black recording system 408 to be recorded. Moreover, in this preferred embodiment, in order to discriminate the pattern of a color extremely near a non-chromatic color in the superposed patterns of the first and second patterns 511 and 512, when the second pattern 512 is recorded, reference patterns 506 of black patterns having the same period are also recorded at the positions corresponding to regions 504 between the color-deviation patterns 501, 502 and 503 for yellow, magenta and cyan of FIG. 19(*a*). By recording such reference patterns 506, it is possible to easily find a pattern of a color extremely near a non-chromatic color.

That is, referring to the reference patterns 506, an unit pattern of a color extremely near a non-chromatic color is found out of the color-deviation detecting pattern 501 for yellow, and on the basis of the number of the color-deviation amount indication 507 corresponding to the found unit pattern, the amount of relative positional-deviation of the color-deviation detecting pattern 501 for yellow with respect to the black pattern 505, i.e.. the amount of color deviation for yellow, can be recognized. Similarly, with respect to the color-deviation detecting pattern 502 for magenta and the color-deviation detecting pattern 503 for cyan, referring to the reference patterns 506, an unit pattern of a color extremely near a non-chromatic color is found out of each of the color-deviation detecting pattern 502 for magenta and the color-deviation detecting pattern 503 for cyan, and on the basis of the number of the color-deviation amount indication 507 corresponding to the found unit pattern, the amount of relative positional-deviation of each of the color-deviation detecting pattern 502 for magenta and the color-deviation detecting pattern 503 for cyan with respect to the black pattern 505, i.e.. the amount of color deviation for each of yellow and cyan, can be recognized.

In this way, according to this preferred embodiment. the amounts of relative positional deviation between the color-deviation detecting patterns 501, 502 and 503 for yellow, magenta and cyan forming the first pattern 511, and the black pattern 503 forming the second pattern 512, i.e., the amounts of color deviation for yellow, magenta and cyan, can be easily detected with the naked eye.

(Eighth Preferred Embodiment)

While only the color deviation in the vertical scanning direction has been detected in the aforementioned preferred embodiments, the color deviation in the horizontal scanning direction can also be detected, and the color deviation in two directions, i.e., in the horizontal and vertical direction, can also be detected.

For example, in an electrophotographic color printer of 4-drum, 1-path system as shown in FIG. 18, although the color deviation is generally great in the paper feeding directions, i.e., in the vertical scanning direction, it also occurs in the direction perpendicular thereto (in the horizontal scanning direction). In particular, when separated later-beam writing systems for the yellow recording system 405, the magenta recording system 406, the cyan recording system 407 and the black recording system 408 are used, color deviation occurs in the horizontal scanning direction since the horizontal scanning widths of the respective colors are different from each other, and color deviation may occur if the photosensitive drums of the respective recording systems are not parallel to each other. In these cases, an image wherein the recorded image is obliquely distorted, i.e., an image wherein skew occurs, is produced.

According to the preferred embodiment, it is possible to detect color deviation in the horizontal scanning direction by changing the directions of unit patterns of the color-deviation detecting pattern.

Figure 20:
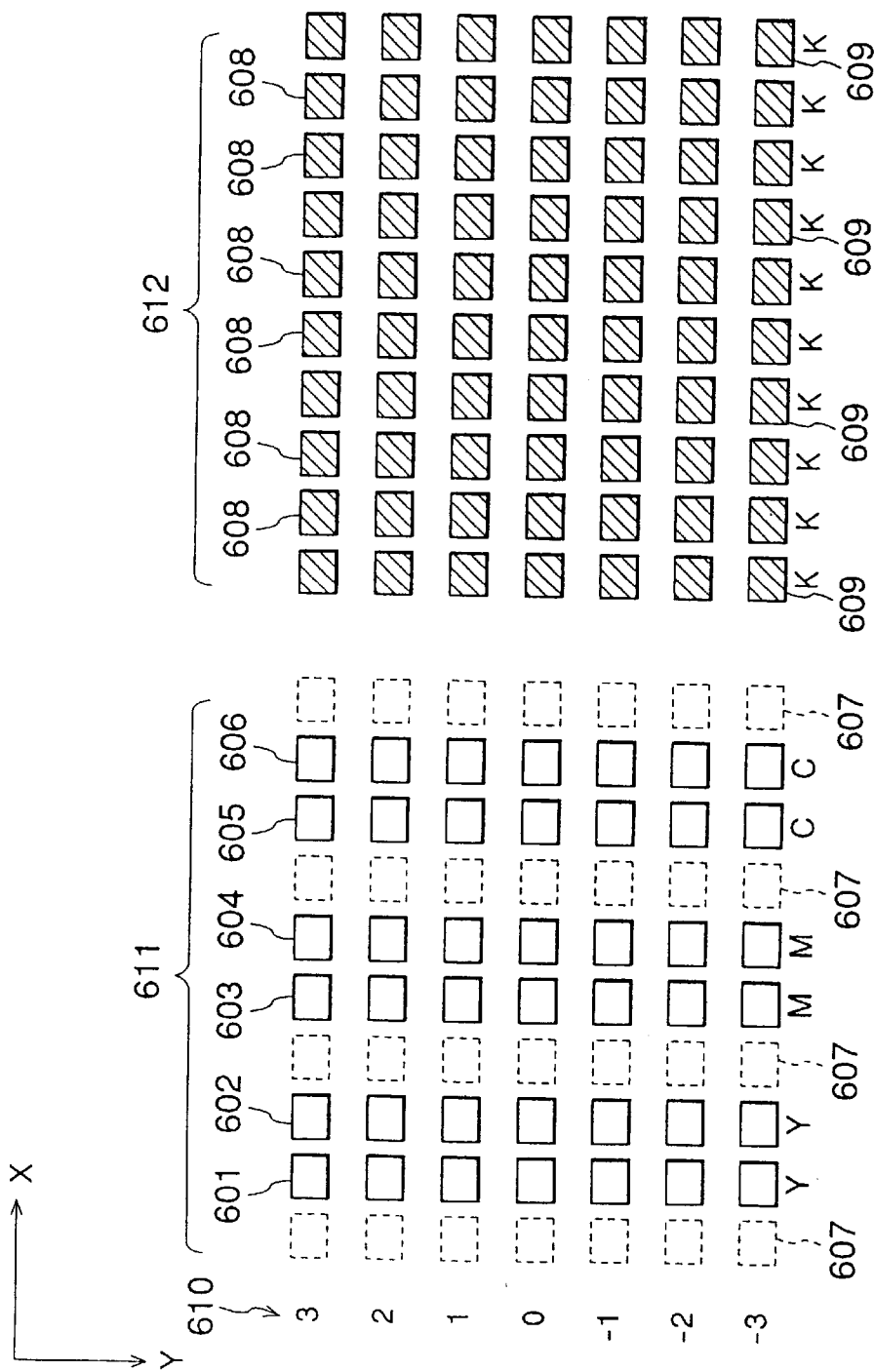
FIGS. 20(a) and 20(b) are views illustrating first and second patterns for detecting the color deviation in the eighth preferred embodiment according to the present invention.

FIG. 20 illustrates a color-deviation detecting pattern which can detect color deviation in the horizontal and vertical scanning directions. In this preferred embodiment, two set of color-deviation detecting patterns for each color of yellow, magenta and cyan are recorded as a first pattern 611 as shown in FIG. 20.

A color-deviation detecting pattern 601 for yellow includes patterns in the direction perpendicular to FIG. 17, i.e., a plurality of straight lines extending in the vertical scanning direction. The color-deviation detecting pattern 601 is a periodic pattern which comprises seven unit patterns having a phase which is shifted from the phase of the adjacent unit pattern, for example, by a picture element. The color-deviation detecting pattern 601 is used for detecting color deviation in the horizontal scanning direction. Another color-deviation detecting pattern 602 is used for detecting color deviation in the vertical scanning direction similar to FIG. 17(a). Similarly, a color-deviation detecting pattern 603 for magenta and a color-deviation detecting pattern 604 for cyan are used for detecting color deviation in the horizontal scanning direction, and another color-deviation detecting pattern 604 for magenta and another color-deviation detecting pattern 606 for cyan are used for detecting color deviation in the vertical scanning direction.

Moreover, near each of the unit patterns forming the color-deviation detecting patterns, color-deviation amount indications 610 indicating the number of picture elements, by which each of the unit patterns is shifted from the central unit pattern serving as a reference (0) in the horizontal and vertical directions, by numerals of −3 from +3.

Then, as a second pattern 612 as shown in FIG. 20(b), the same black patterns 608 having no phase shift in both of the horizontal and vertical scanning directions are superposed on the first pattern 611 to be recorded. In addition, in this preferred embodiment, in order to discriminate a pattern having a color extremely near a non-chromatic color, reference patterns 609 comprising the same periodic patterns of black are also recorded at positions corresponding to regions 607 expressed by broken lines near the color-deviation detecting patterns 601 through 606 of FIG. 20(a) when the second pattern 612 is recorded. By recording these reference patterns 609, it is possible to easily find a pattern having a color extremely near a non-chromatic color.

That is, an unit pattern having a color extremely near a non-chromatic color is found with respect to each of the color-deviation detecting patterns 601 through 606 on the basis of the reference patterns 609. On the basis of the numeral of the color-deviation amount indication 610 corresponding to the found unit pattern, with respect to each of the patterns 601 through 606, i.e., with respect to each of yellow, magenta and cyan, the amounts of relative positional deviations with respect to the black pattern 608 in the horizontal and vertical scanning directions, i.e., the amounts of color deviations of yellow, magenta and cyan images in the horizontal and vertical scanning directions, can be recognized.

Thus, according to this preferred embodiment, it is possible to easily detect color deviation for each color in the horizontal and vertical scanning direction with the naked eye.

(Ninth Preferred Embodiment)

Figure 21:
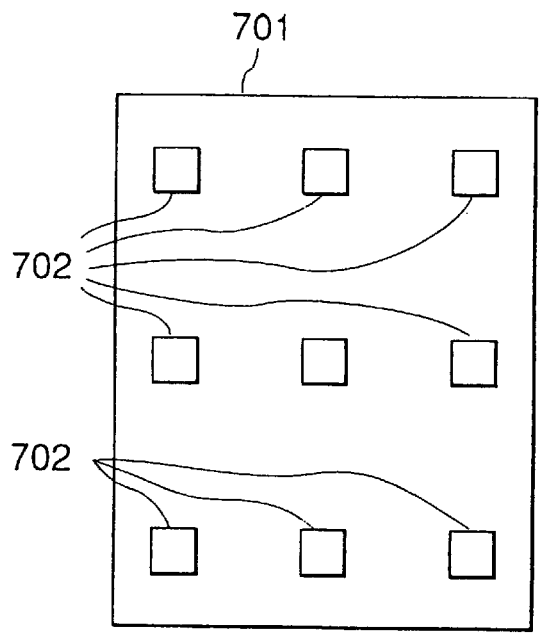
FIG. 21 is a view illustrating a pattern for detecting the positional deviation on a recording paper in the ninth preferred embodiment according to the present invention.

In this preferred embodiment, it is possible to detect the amount of color deviation at various positions on a recording paper. That is, as shown in FIG. 21, color-deviation detecting patterns 702 comprising the superposed pattern of the first and second patterns 511 and 512 as shown in FIG. 19 or the superposed pattern of the first and second patterns 611 and 612 as shown in FIG. 20, together with color-deviation indications (not shown), are recorded at various positions of a recording paper 601 of, for example, A4 size or another standard-size.

Although the amount of color deviation varies in accordance with the position on the recording paper 710, it is possible to detect the amount of color deviation for each color at the respective positions with the naked eye, by detecting the color-deviation detecting patterns 702 at a plurality of positions on the recording paper 701 according to this preferred embodiment. In particular, when the superposed pattern of the first and second patterns 611 and 612 of FIG. 20 is recorded as the color-deviation detecting pattern 702, it is possible to detect the amount of color deviation in the horizontal and vertical scanning directions at the respective positions, so that it is possible to detect color deviation of a two-dimensionally distorted shape.

(Tenth Preferred Embodiment)

In this preferred embodiment, the periodic pattern used as the color-deviation detecting pattern in the aforementioned preferred embodiment will be described. It is desired that the periodic pattern for detecting color deviation is a pattern having a peak of a sharp self-correlation. As such a pattern, there are not only the aforementioned M-sequence (the maximum length sequence), but there are also the quadratic residue sequence (also called the Legendre sequence), the twin-prime sequence, the Hall sequence, the Barker sequence and so forth.

Out of them, with respect to the M-sequence, the Barker sequence and the quadratic residue sequence, specific patterns are shown in Table 2.

TABLE 2

|  | n | PATTERN | C/T |
|---|---|---|---|
| M-Sequence | 3 | 010 | 1/3=0.33 |
|  | 7 | 0001101 | 2/7=0.29 |
|  | 15 | 000011101100101 | 4/15=0.27 |
|  | 31 | 0000011100100010101111011010011 | 8/31=0.26 |
| Barker Sequence | 4 | 0001 | 1/4=0.25 |
|  | 5 | 00001 | 1/5=0.2 |
|  | 7 | 0001101 | 2/7=0.29 |
|  | 11 | 00010010111 | 3/11=0.27 |
|  | 13 | 0000001100101 | 3/13=0.23 |
| Quadratic Residue Sequence | 3 | 010 | 1/3=0.33 |
|  | 7 | 0001101 | 2/7=0.29 |
|  | 11 | 00010010111 | 3/11=0.27 |
|  | 19 | 0000110010011110101 | 5/19=0.26 |

In this table, n is the number of picture elements per a period, and C/T is a ratio of the number (C) of picture elements wherein no color is superposed, per a period.

For practical use, it is desired in these periodic patterns that (1) the detectable range of the amount of color deviation is wide, specifically the sequence has a long period, (2) the color deviation causes a great variation of color, i.e., the number of picture element wherein no color is superposed when the phase is shifted by one period is great (C is great), and (3) since the color deviation is detected with the naked eye, the colored states of these periodic patterns are uniform, i.e., many numerals of 0 or 1 do not continue.

On examination with respect to these three points, although n=7, 15 or 31 is suitable for the M-sequence, and n=4, 7 or 11 is suitable for the Barker sequence, the others are unsuitable. Furthermore, n=7 of the Barker sequence is the same as those of the M-sequence and the quadratic residue sequence, and n=11 thereof is the same as that of the quadratic residue sequence. In the quadratic residue sequence, n=7, 11 or 19 is suitable.

After these patterns were practically recorded to he confirmed, it was found that as the characteristics of the patterns determined as a suitable pattern, the ratio (C/T) of the number (C) of picture elements wherein no color is superposed, per a period (T) when color deviation occurs, is 0.25 or more. If this value is small, the colored state is week, so that it is inconvenient for discrimination with the naked eye. In addition, the period of the pattern examined herein is in the range of from 4 picture elements to 31 picture elements. In practice, since greater color deviation than 31 picture elements causes a deviation of, for example, 1 mm or more in a high definition recording of 600 dpi, it is possible to sufficiently recognize color deviation with the naked eye if the aforementioned pattern is not used.

(Eleventh Preferred Embodiment)

In order to obtain a correction value for the correction of color deviation by detecting the amount of color deviation in a color printer, the long-period pattern as described in the sixth preferred embodiment is not always required as the periodic pattern for detecting color deviation. However, in order to accurately detect a greater amount of color deviation, it is required to use a long-period pattern as the color-deviation detecting pattern. However, in this case, a great number of 0 to 1 may continue. In a portion wherein the number of the continuously arranged 0 or 1 is great, the variation of color can be scarcely found when the amount of color deviation is small. For example, in the case of a long-period pattern having a period of about 63 picture elements, it is difficult to recognize the whole colored state since the colored state varies at different portions.

Figure 22:
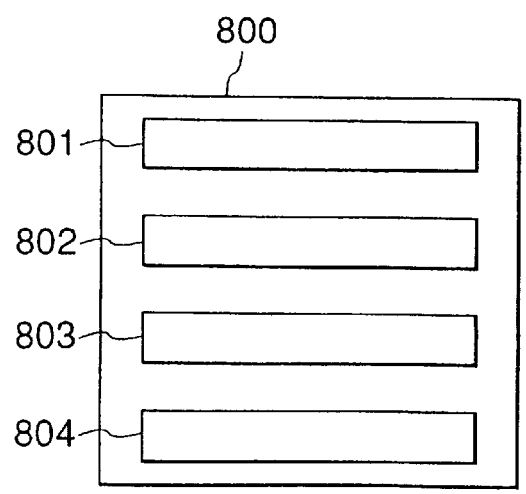
FIG. 22 is a view illustrating the arrangement of patterns having different phase-shiftings and forming patterns for detecting the long-period color deviation in the tenth preferred embodiment according to the present invention.

Therefore, in this preferred embodiment, a plurality of color-deviation detecting patterns which are the same patterns, each having a phase shifted from another, is prepared to be recorded at positions close to each other, so as to determine the whole colored state. For example, a pattern 800 as shown in FIG. 22 is prepared as a pattern corresponding to the unit pattern 304 of FIG. 17. This pattern 800 comprises four color-deviation detecting patterns 801, 802, 803 and 804 which are the same patterns of different phases, i.e., which are shifted from another in the horizontal scanning direction.

For example, in the second preferred embodiment as illustrated in FIG. 17, when the pattern 800 of FIG. 22 is recorded as the central unit pattern 304 serving as the reference (0) in the first pattern 311, if there is no color deviation in the superposed pattern of the first and second patterns 311 and 312 of FIG. 17, all the positions of four patterns 801, 802, 803 and 804 have a non-chromatic color, i.e., no color, so that it is possible to detect the presence of color deviation.

By using such a pattern 800 to detect color deviation, it is possible to use a periodic pattern of an extremely long period, and to detect a greater color deviation. Furthermore, each of the patterns 801, 802, 803 and 804 may be a short pattern of less than a period. In order to detect the amount of color deviation in one period, the whole of the pattern 800 may have one period.

(Twelfth Preferred Embodiment)

Figure 23:
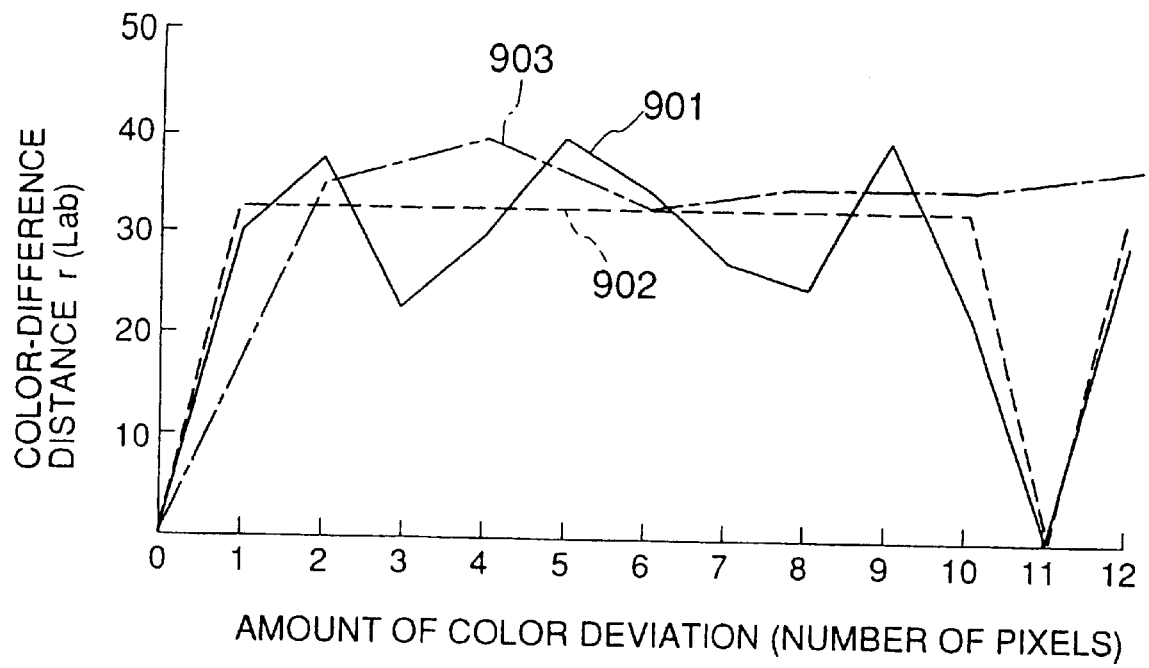
FIG. 23 is a graph showing the calculated and measured values of color-difference distance with respect to the amount of the color deviation when using the periodic pattern of period 11 as the pattern for detecting the color deviation, and the values wherein the influence by the bleeding at picture points is decreased, in the eleventh preferred embodiment according to the present invention.

FIG. 23 is a graph wherein this axis of abscissa expresses the amounts of color deviation when the periodic pattern 11 of the Barker sequence or the quadratic residue sequence is used as the color-deviation detecting pattern, and the axis of ordinate expresses the distance (called "color-difference distance) r in the L*a*b* coordinate between the color (a non-chromatic color) of a pattern having no color deviation and the color of a pattern having color deviation. In FIG. 23, the solid line 901 expresses the measured value. In general, it is possible to easily discriminate the difference of color when the color-difference distance r is 5 or more, and the difference of color is sufficient for discriminating that they are colors of different systems when r is 10 or more. On the solid line 901 of FIG. 23, any amounts of color deviations have a color-difference distance r of 20 or more, so that it is possible to sufficiently discriminate the presence of color deviation.

In the ideal case wherein the recorded picture point has no bleeding, the color-difference distance r varies as the broken line 902 of FIG. 23 with respect to the amount of color deviation. On the other hand, in practice, since the recording picture point is expanded by about 30 to 40% due to the bleeding thereof in comparison with a recording picture point having no bleeding, the color-difference distance r fluctuates due to the amount of color deviation as expressed by the solid line 901 of FIG. 23. Since the minimum recording picture point tends to bleed to increase as the recorded image becomes high definition, there is a problem in that the fluctuation of the color-difference distance r due to the amount of color deviation increases. Moreover, for example, in an usual color printer having a resolution of about 600 dpi, it is difficult to equalize the width of a while line with that of a black line, and it is required to strongly record a character image, so that it is usually designed that the width of a black line is thicker than that of a while line.

Therefore, in order to decrease the fluctuation of the color-difference distance r due to the amount of color deviation, in this preferred embodiment, a picture element of 0 or 1 is assigned every a plurality of picture points, not every a picture point, for example, every two picture points, of the recording picture points, and the recording is performed by a picture element of a double size. Thus, by partially superposing the bleedings of two recording picture points, the influence by the bleeding of the recording picture point is extremely smaller than the recording every a picture point, so that the fluctuation of the color-difference distance with respect to the amount of color deviation decreases. The dashed line 903 of FIG. 23 expresses the measured value of the color-difference distance r with respect to the amount of color deviation when the size of a picture element is doubled to perform the recording, and it can be seen that the fluctuation of the color-difference distance is effectively restrained.

Furthermore, when the size of the picture element increases, the sensitivity of the detection of color deviation decreases. That is, when color deviation occurs by two picture elements, the sensitivity varies to approximately to the final value. Therefore, when the sensitivity of the detection of color deviation is too high to discriminate the coincident point, a plurality of picture elements may be used as an unit of a picture element. Furthermore, since the amount of color deviation of up to two picture elements is approximately in proportion to the color-difference distance, it is possible to estimate the amount of color deviation on the basis of the color-difference distance.

Thus, according to this preferred embodiment, 0 or 1 of a picture element is assigned every a plurality of picture points out of the recording picture points, and the recording is performed by the size of a picture element times as large as the original size. Therefore, the fluctuation of the color-difference distance due to the amount of color deviation can be restrained to surely detect the presence of color deviation, and the amount of color deviation of up to two picture elements can be estimated on the basis of the color-difference distance.

(Thirteen Preferred Embodiment)

Figure 24:
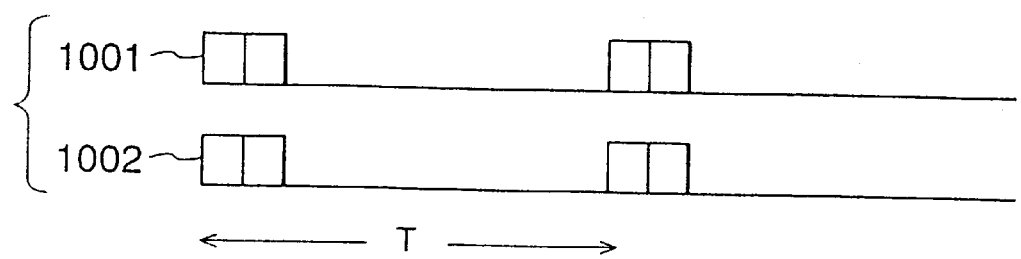
FIG. 24 is a view illustrating the color-deviation detecting pattern for detecting the amount of color deviation on the basis of the amount of color difference in the twelfth preferred embodiment according to the present invention.
Figure 25:
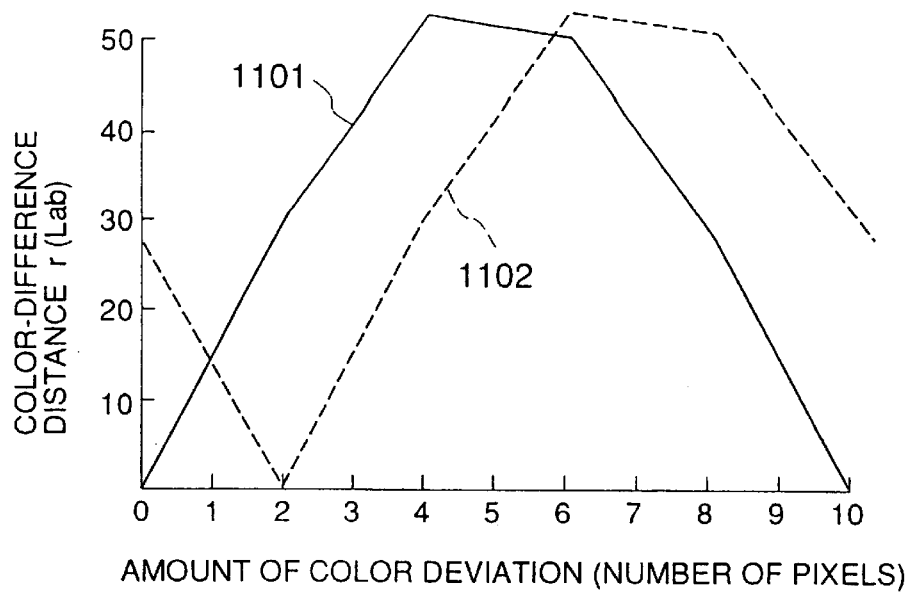
FIG. 25 is a graph showing the relationship between the color deviation and the color-difference distance in the twelfth preferred embodiment.

The method for detecting the amount of color deviation on the basis of the degree of color difference in a superposed pattern as illustrated in the twelfth preferred embodiment is unsuitable for the case that color difference completely fluctuates in a period of the pattern. When the color-deviation detecting pattern wherein the transit point between 0 and 1 in one period is present at only one point is used as shown in FIG. 24, the relationship between the amount of color deviation and the color-difference distance forms a wave form of a single peak as shown in FIG. 25. In such a case, for example, the pattern 800 including the plurality patterns 801, 802, 803 and 804 having a shifted phase as shown in FIG. 22 is prepared, and this pattern 800 is used, for example, as the unit pattern 304 serving as the reference in the first pattern 311 of FIG. 17. Even if the first and second patterns 311 and 312 do not detect the coincident point, it is possible to detect the amount of color deviation by measuring the color-difference distance of the superposed pattern of the first and second pattern.

The solid line 1101 of FIG. 25 expresses the measured results obtained by superposing the patterns 1001 and 1002 of FIG. 24 to record a superposed pattern similar to the last preferred embodiment, and by recording the color difference of the superposed pattern from a color having no color deviation (a non-chromatic color), with respect to the amount of color deviation for each color. As can be seen from this figure, the amount of color deviation of up to about four picture elements can be estimated on the basis of color difference. However, the direction of color deviation can not be discriminated.

Figure 26:
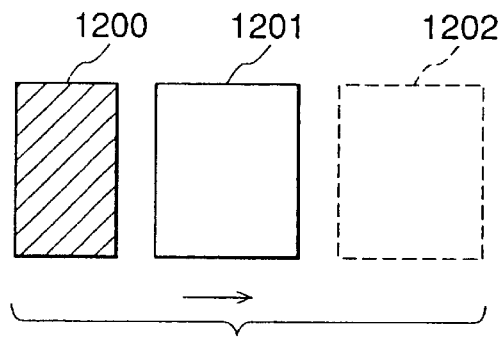
FIG. 26 is a view illustrating a method for discriminating the direction of the color deviation in the twelfth preferred embodiment.

Therefore, as a color-deviation detecting pattern, a reference pattern 1200 of only black and two superposed patterns 1201 and 1202 are prepared as shown in FIG. 26. One superposed pattern 1201 corresponds to the solid line 1101 of FIG. 25, and another superposed pattern 1202 corresponds to the broken line 1102 which is shifted from the solid line 1101 by two picture elements. That is, the phases of the superposed patterns 1201 and 1202 are shifted from another, for example, in the vertical scanning direction, or in the vertical and horizontal scanning directions. By the combination of color-difference distances corresponding to these two superposed patterns 1201 and 1202, it is possible to discriminates as to whether the direction of color deviation is positive or negative direction.

(Fourteenth Preferred Embodiment)

Since the amount of color deviation is distanced by the color-difference distance in the eight and ninth preferred embodiments, these embodiments are unsuitable for the detection of the amount of color deviation with the naked eye although they are suitable for the provision of a color-deviation detecting system for automatically detecting the amount of color deviation by means of a detector.

Figure 27:
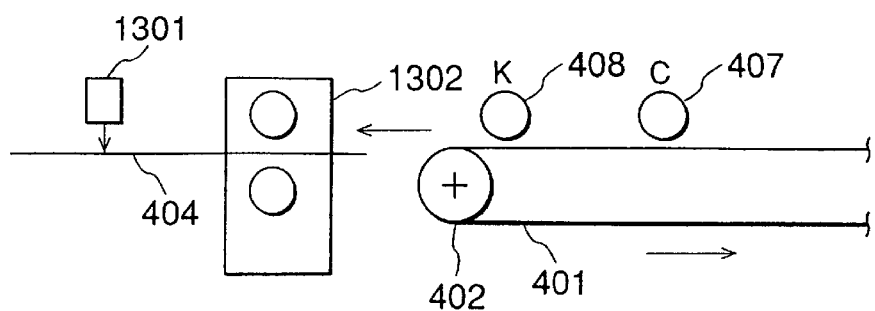
FIG. 27 is a schematic diagram of a color-deviation detecting system in the thirteenth preferred embodiment according to the present invention.
Figure 28:
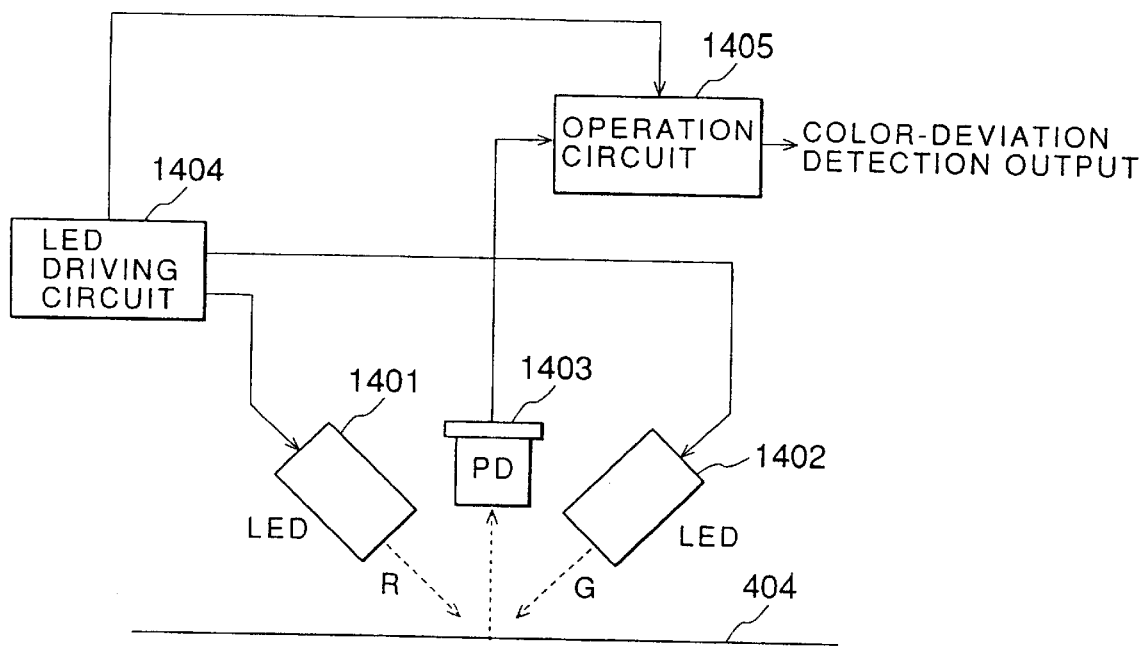
FIG. 28 is a schematic diagram of a color sensor in the thirteenth preferred embodiment.

Referring to FIGS. 27 and 28, the fourteenth preferred embodiment of a color-deviation detecting system according to the present invention will be described below.

As shown in FIG. 27, a color sensor 1301 is arranged on a paper discharging system of a color printer. After the recording paper 404 developed by an electrophotographic color printer of 4-drum, 1-path system as shown in FIG. 18 passes through a fixing device 1302 to be fixed, it passes in front of a color-difference detecting color sensor 1301.

As shown in FIG. 28, the color-difference detecting color sensor 1301 comprises two lighting LEDs 1401 and 1402 and a light detector 1403. The LED 1401 has an emission distribution around red, and the LED 1402 has an emission distribution around green. The LEDs 1401 and 1402 will be hereinafter referred to a "red LED" and a "green LED", respectively. These red LED 1401 and green LED 1402 are driven by a LED driving circuit 1404 to be turned on to illuminate the recording paper 404. The light detector 1403 detects the reflection light from the recording paper 404 luminated by the LEDs 1401 and 1402 to output an electric signal. The output signal is inputted to an operation circuit 1405. The operation circuit 1405 derives the amount of color deviation by an operation on the basis of the output signal of the light detector 1403.

Figure 29:
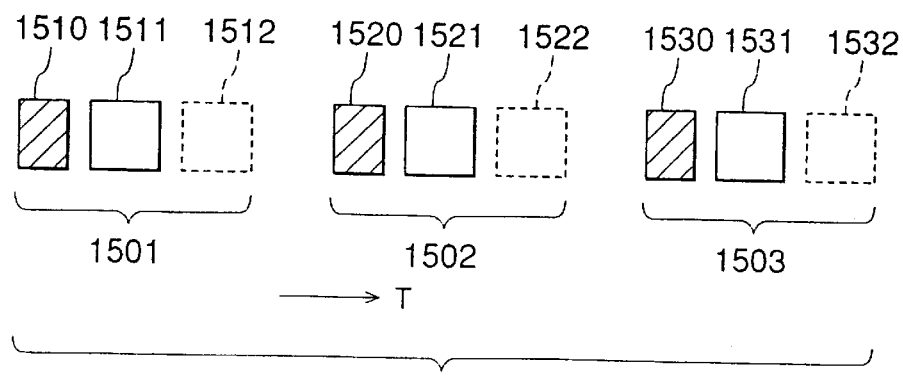
FIG. 29 is a view illustrating patterns for detecting the color deviation in the thirteenth preferred embodiment.

On the other hand, in the recording paper 404, as the color-deviation detecting patterns, color-deviation detecting patterns 1501, 1502 and 1503 for cyan, magenta and yellow are previously recorded, for example, at regular intervals in the vertical scanning direction, as shown in FIG. 29. The color-deviation detecting pattern 1501 for cyan comprises a reference pattern 1510 of only black, and two superposed patterns 1511 and 1512 of periodice patterns for cyan and black. The color-deviation detecting pattern 1502 for magenta comprises a reference pattern 1520 of only black, and two superposed patterns 1521 and 1522 of periodic patterns for magenta and black. The color-deviation detecting pattern 1503 comprises a reference pattern 1530 of only black, and two superimposed patterns 1531 and 1532 of periodic patterns for yellow and black. The periodic patterns for black, cyan, magenta and yellow are the same pattern. In addition, the phases of the two superposed patterns 1511, 1512, 1521, 1522, 1531 and 1532 for each color of cyan, magenta and yellow, are shifted, for example, in the vertical scanning direction or the vertical and horizontal scanning directions, similar to the two superposed patterns 1201 and 1202 of FIG. 25, so that the direction of color deviation can be recognized by the combination of the color-difference distance for each color.

According to this preferred embodiment, it is possible to automatically detect color deviation with respect to each cyan, magenta and yellow on the recording paper 404, as will be described below.

First, the detection of color deviation for cyan will be described. The red LED 1401 and the green LED 1402 are turned on by the LED driving circuit 1404, and the reflection light from the reference pattern 1510 of only black is first detected by means of the light detector 1403. This detection output will be used for the normalization of detection outputs of reflecting lights from the superposed patterns 1511 and 1512 later.

Then, similarly, the red LED 1401 and the green LED 1402 are sequentially turned on by the LED driving circuit 1404, and the reflection lights from the superposed patterns 1511 and 1512 are detected by means of the light detector 1403. Moreover, similarly, the red LED 1401 and the green LED 1402 are sequentially turned on by the LED driving circuit 1404, and the reflection lights from the superposed patterns 1511 and 1512 are detected by means of the light detector 1403. When there is no color deviation, the superposed patterns 1511 and 1512 are the same.

When color deviation of cyan occurs, cyan appears in the superposed patterns 1511 and 1512. Since cyan in the superposed patterns 1511 and 1512 is the same as black with respect to the illumination by the red LED 1401, the light reflectances of the superposed patterns 1511 and 1512 decrease by an amount corresponding to the amount of color deviation. However, since cyan in the superposed patterns 1511 and 1512 is the same as white with respect to the illumination by the green LED 1402, the light reflectances of the superposed patterns do not decrease if color deviation occurs. Therefore, if the difference (color-difference output) between the output of the light detector 1403 in the presence of illumination by the red LED 1401 and the output of the light detector 1403 in the presence of illumination by the green LED 1402 is derived by the operation circuit 1405, the amount of color deviation for cyan can be detected.

Moreover, in comparison between when the red LED 1401 and the green LED 1402 illuminate the superposed pattern 1511 and when they illuminate the superposed pattern 1512, the polarities of the color-difference outputs are different, and the combination of the polarities vary in accordance with the direction of color deviation. Therefore, the direction of color deviation can be detected by the combination of the polarities of color-difference outputs.

Then, the detection of color deviation for magenta will be described. The red LED 1401 and the green LED 1402 are turned on by the LED driving circuit 1404, and the reflection light from the reference pattern 1520 of only black is first detected by means of the light detector 1403. This detection output will used for the normalization of detection outputs of reflection lights from the superposed patterns 1521 and 1522 later.

Similarly, the red LED 1401 and the green LED 1402 are sequentially turned on by means of the LED driving circuit 1404, and the reflection lights from the superposed patterns 1521 and 1522 are detected by means of the light detector 1403. Moreover, similarly, the red LED 1401 and the green LED 1402 are sequentially turned on by means of the LED driving circuit 1404, and the flection lights from the superposed patterns 1521 and 1522 are detected by means of the light detector 1403. When there is no color deviation, the superposed patterns 1521 and 1522 are the same.

When color deviation for magenta occurs, since magenta in the superposed patterns 1521 and 1522 is the same as while with respect to illumination by means of the red LED 1401, the light reflectances of the superposed patterns 1521 and 1522 do not decrease if color deviation occurs. However, since magenta in the superposed patterns 1521 and 1522 is the same as black with respect to illumination by means of the green LED 1402, the light reflectances of the superposed patterns 1521 and 1522 decrease by an amount corresponding to the amount of color deviation. Therefore, if the difference (color-difference output) between the output of the light detector 1403 in the presence of illumination by mean of the red LED 1401 and the output of the light detector 1403 in the presence of illumination by means of the green LED 1402 is derived by mean of the operation circuit 1405, the amount of color deviation for magenta can be detected.

Moreover, in comparison between when the red LED 1401 and the green LED 1402 illuminate the superposed pattern 1521 and when they illuminate the superposed pattern 1522, the polarities of the color-difference outputs are different, and the combination of the polarities vary in accordance with the direction of color deviation. Therefore, the direction of color deviation can be detected by the combination of the polarities of color-difference outputs.

Then, the detection of color deviation for yellow will be described. The red LED 1401 and the green LED 1402 are turned on by means of the LED driving circuit 1404, and the reflection light from the reference pattern 1530 of only black is first detected by means of the light detector 1403. This detection output will be used for the normalization of detection outputs of reflection lights from the superposed patterns 1531 and 1532 later.

Then, the red LED 1401 and the green LED 1402 are sequentially turned on by means of the LED driving circuit 1404, and the reflection lights from the superposed patterns 1531 and 1532 are detected by means of the light detector 1403. Moreover, the red LED 1401 and the green LED 1402 are sequentially turned on by means of the LED driving circuit 1404, and the reflection lights from the superposed patterns 1531 and 1532 are detected by means of the light detector 1403. When there is no color deviation, the superposed patterns 1531 and 1532 are the same.

When color deviation for yellow occurs, since yellow in the superposed patterns 1531 and 1532 is substantially the same as white with respect to both illuminations by means of the red LED 1401 and the green LED 1402, the light reflections of the superposed patterns 1531 and 1532 do not so decrease.

Therefore, a pattern obtained by superposing a periodic pattern of yellow on magenta uniformly recorded, to record the superposed pattern and by superposing a periodic pattern of black thereon to record the superposed pattern, is used as the superposed patterns 1531 and 1532, and it is assumed that the superposed portion of magenta and yellow is red. With this construction, since red appears in the superposed patterns 1531 and 1532 when color deviation occurs, the light reflectances of the superposed patterns 1531 and 1532 decrease by the amount corresponding to the amount of color deviation. Therefore, in this case, it is also possible to detect the amount of color deviation of yellow with a certain accuracy by deriving the difference (color-difference output) between the output of the light detector 1403 in the presence of the illumination of the red LED 1401 and the output of the light detector 1403 in the presence of the illumination of the green LED 1402, by means of the operation circuit 1405. Since yellow has a higher brightness than magenta and cyan, it is felt that the difference between yellow and while is small, so that it is allowable if the detection accuracy of color deviation is not so good.

Moreover, the polarities of the color-difference outputs are different between the superposed patterns 1531 and 1532 illuminated by means of the red LED 1401 and the green LED 1402, and the combination of the polarities varies in accordance with the direction of color deviation, so that it is possible to detect the direction of color deviation on the basis of the combination of the polarities of the color-difference outputs.

According to this preferred embodiment, it is possible to detect the amount and direction of color deviation for cyan, magenta and yellow by deriving the color difference by means of a color sensor comprising LEDs of at least two colors including red and green and a light detector.

Furthermore, while LEDs of two colors are used as a light source for detecting color deviation in this preferred embodiment, it can be clearly seen from the above descriptions that a blue LED may be used although the manufacturing cost increases. Of course, a color sensor may be used.

Moreover, while the amount of color deviation is detected on the basis of the color-deviation detecting patterns recorded on the recording paper 404 in this preferred embodiment, the color-deviation detecting patterns may be recorded on the carrier/transfer belt 401. In this case, after the detection of color deviation and the correction of color deviation on the basis thereof, the color-deviation detecting patterns on the carrier/transfer belt 401 may be removed by cleaning.

(Fifteenth Preferred Embodiment)

While an exclusive color sensor for detecting color deviation has been used in the fourteenth preferred embodiment, the detection of color deviation in a color image recording system having a color scanner, such as a color printer and a color copying machine to which a color sensor (a color scanner) is connected, will be described in this preferred embodiment.

Figure 30:
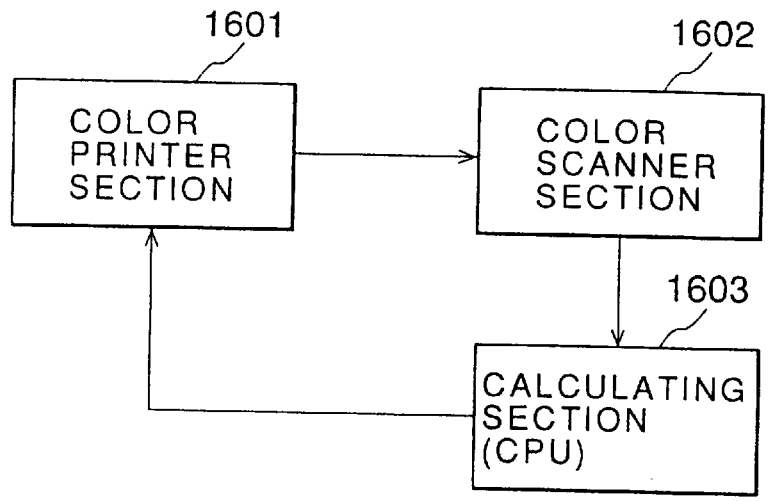
FIG. 30 is a schematic block diagram of the fourteenth preferred embodiment of a color recording system according to the present invention.

FIG. 30 is a block diagram showing the construction of a color image recording system in this preferred embodiment. In this system, a color chart image outputted from a color printer section 1601 is inputted to a color scanner section 1602. Data obtained by reading a superposed pattern for detecting color deviation by means of the color scanner section 1602 are inputted to a calculating section (CPU) 1603 to detect color deviation, and the detection value of color deviation is caused to feedback to the color printer section 1601, so that the correction of color deviation is performed by a color-deviation correction circuit provided in the color printer section 1601.

In such a system, since it is required to detect stably and accurately the amount of color deviation, the detection of color deviation is performed in the similar manner to those of the fifth through eleventh preferred embodiments. That is, a method for detecting the presence of color deviation by discriminating as to whether the superposed pattern has a chromatic or non-chromatic color is used, and the similar patterns to those in the fifth through eleventh preferred embodiments are used as the superposed patterns.

The colored portion of the superposed pattern due to color deviation starts from the transit point between white and black. Therefore, in a periodic pattern of the M-sequence or the like, the uniform coloring on the pattern in not always started. On the other hand, in a system as shown in FIG. 30, since the superposed pattern is read out by means of a color scanner section 1602 of a high resolution, for example, 600 dpi, it is difficult to detect the presence of coloring by means of a read signal itself.

However, since the superposed pattern for detecting color deviation is a periodic pattern and the period thereof is known, if the signal read out by means of the color scanner section 1602 is averaged over the period of this periodic pattern, it is possible to easily calculate the color-difference distance r as shown in FIG. 23. In addition, if the color-difference distance r is calculated on the basis of a reference pattern of only black, for example, the reference pattern 609 of FIG. 20, in order to assure the calculating accuracy of the color-difference distance r, it is possible to stably and accurately derive the color difference.

Furthermore, in the above descriptions, the color deviation is detected by using the superposed pattern of a periodic pattern of black and another periodic pattern of a chromatic color. In this case, the portion wherein a black picture element is superposed on a color picture element becomes black. Other portions become the colors of the respective picture elements. That is, the superposed portion of a color picture element and while becomes the color of the picture element, and the superposed portion of a black picture element and white becomes black. Therefore, when no color deviation is present in the superposed pattern, it becomes black, and when color deviation is present therein, the picture element is colored, so that it is possible to very easily detect color deviation.

However, it is not so easy to measure the amount of color deviation, for example, between yellow and magenta without a periodic pattern of black. When the amount of color deviation between yellow and magenta is detected, it becomes the difference between the superposed color of yellow and magenta, and the color obtained by the arrangement of colors in parallel. In general, this difference is relatively small in a color having a high clarity, so that the difference can not be recognized unless it is very carefully observed with the naked eye. Therefore, it is not appropriate to directly detect the color deviation between yellow and magenta.

As the easiest method for detecting the color deviation between yellow and magenta, there is a method for calculating the color deviation between yellow and magenta after detecting the color deviations between black and yellow and between black and magenta. However, in a color printer having no black, it is possible to directly detect the color deviation from black. Therefore, the inks of yellow, magenta and cyan may be superposed to produce a pseudo pattern corresponding to black ink to detect the amount of color deviation between the pseudo pattern corresponding to black, and magenta and yellow.

(Sixteenth Preferred Embodiment)

While the periodic pattern has been used as the color-deviation detecting pattern in the fifth through fifteenth preferred embodiments, it is possible to detect color deviation using a non-periodic pattern. For example, an error diffusion pattern is suitable for the non-periodic pattern.

Figure 31:
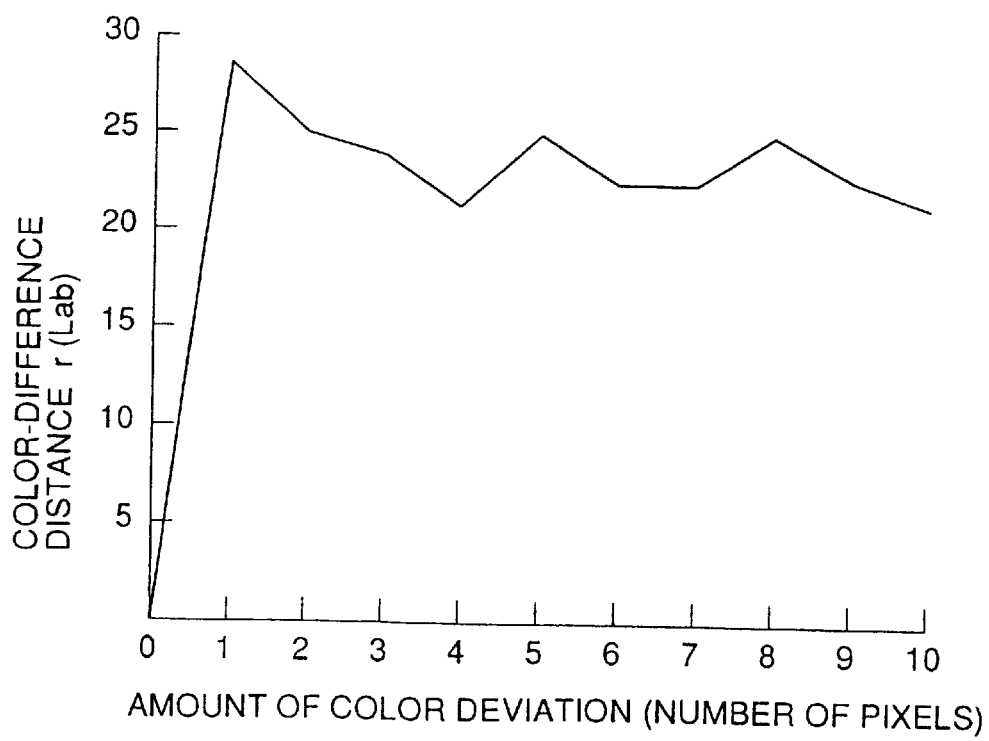
FIG. 31 is a graph showing the relationship between the amount of the color deviation and the color-difference distance when the asynchronous pattern produced by the error diffusion method are used as the color-deviation detecting pattern, in the fifteenth preferred embodiment according to the present invention.

FIG. 31 shows the relationship between the amount of color deviation and the color-difference distance r when using the superposed pattern of a black pattern and a chromatic color pattern, which comprises a non-periodic pattern produced by a general binary error diffusion method in 400 dpi. As shown in this figure, the position wherein the amount of color deviation is 0 is one point wherein the black pattern is coincident with the chromatic color pattern, unlike the case that a periodic pattern is used.

Figures 32, 33:
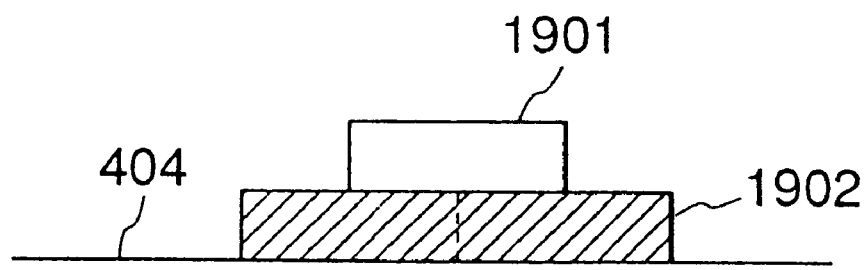
FIG. 32 is a view illustrating a two-dimensional arrangement of the pattern for detecting the color deviation in the fifteenth preferred embodiment.
FIG. 33 is a view illustrating the first and second patterns for detecting the color deviation having a dead region in the sixteenth preferred embodiment according to the present invention.

In addition, since the error diffusion pattern is a two-dimensional pattern, both of color deviations in the horizontal and vertical scanning directions are detected simultaneously. Therefore, in this case, a 5×5 color-deviation detecting pattern corresponding to the combination of color deviations in the range of ±2 picture elements in both of the horizontal and vertical scanning directions may be used as shown in FIG. 32.

(Seventeenth Preferred Embodiment)

While the same pattern has been used as the black and chromatic-color patterns which form the superposed pattern for detecting color deviation in the fifth through sixteenth preferred embodiments, both patterns may be different.

When color deviation occurs by ½ picture element, the color-difference distance r is about 15 as expressed by the solid line 901 of FIG. 23. In this case, although it is sufficient to discriminate the color deviation with the naked eye, there is not notable difference in comparison with the color-difference distance in color deviation of one picture element. Therefore, in this preferred embodiment, the line width of the chromatic color pattern 1901 is designed to be about half of the line width (the width of a picture element) of the black pattern 1902. Thus, when color deviation occurs by ±½ picture element, the superposed pattern is not colored to remain being a non-chromatic color, so that the color-difference distance r becomes 0, thereby making the difference from color deviation by one picture element clear.

Therefore, in this preferred embodiment, by providing a dead region wherein no color-difference occurs with respect to color deviation of up to ±½ picture element, it is possible to easily discriminate the presence of color deviation.

What is claimed is:

1. An image recording system for deriving a recorded image by scanning on the basis of a recording signal produced from an image signal which is obtained from image storage means, said system comprising:

positional-deviation amount indicative signal producing means for producing a positional-deviation amount indicative signal representative of a positional deviation of a scanning line forming said recorded image;

positional-deviation correcting means for correcting the positional deviation of said scanning line by controlling a pixel position to be taken from said image storage means so as to obtain a correction pixel position, and by causing said correction pixel position to correspond to a recording position of said scanning line, on the basis of the positional-deviation amount indicative signal; and density-deviation correcting means for correcting a density deviation of said correction pixel position corresponding to a pixel pattern surrounding said correction pixel position as a center, wherein said surrounding pixel pattern is obtained from said image storage means.

2. The image recording system according to claim 1, further comprising:

signal converting means for converting the image signal outputted from said density-deviation correcting means, into a pulse-width modulation signal to derive said recording signal.

3. The image recording system according to claim 2, further comprising:

pulse-width modulation signal correcting means for deriving said recording signal by correcting the pulse-width modulation signal outputted from said signal converting means, on the basis of the positional-deviation amount indicative signal in the horizontal scanning direction produced by said positional-deviation amount indicative signal producing means.

4. An image recording system for deriving a recorded image by scanning on the basis of a recording signal, said system comprising:

positional-deviation amount indicative signal producing means for producing a positional-deviation amount indicative signal representative of a positional deviation of a scanning line forming said recorded image;

positional-deviation correcting means for correcting the positional deviation of said scanning line on the basis of the positional-deviation amount indicative signal produced from said positional-deviation amount indicative signal producing means;

density-deviation correcting means for correcting a density deviation of said recorded image due to the correction of the positional deviation by said positional-deviation correcting means, on the basis of said image signal, said system further comprising first signal converting means for converting an inputted pulse-width modulation signal into a first image signal, wherein said positional-deviation correcting means corrects said positional deviation of said scanning line with respect to said first image signal to derive a second image signal, wherein said density-deviation correcting means corrects a positional deviation of said first or second image signal to derive a third image signal, and wherein said system further comprising second signal converting means for converting said third image signal into a pulse-width modulation signal to derive a recording signal.

5. The image recording system according to claim 1, wherein said system derives a recorded color image by scanning each of black and primary colors on the basis of recording signals of black and primary color signals produced on the basis of a color image signal of black and primary colors and which is obtained from said image storage means;

said positional-deviation amount indicative signal producing means produce said positional-deviation amount indicative signal representative of said positional deviation of scanning line forming images of at least primary colors of said color image signal;

said positional-deviation correcting means representatively corrects positional deviations of scanning lines by controlling a pixel position to be taken from said image storage means to obtain said correction pixel position, and causing the correction pixel position to correspond to a recording position of said scanning line, on the basis of each of the positional-deviation amount indicative signal of said primary colors; and said density-deviation correcting means corrects density deviations by performing a density correction of said correction pixel position corresponding to a pixel pattern surrounding said correction pixel position as a center of each of said primary colors.

6. A recording method for detecting a relative positional deviation between images of a plurality of colors in a color image recording system which records images of the plurality of colors, wherein a superposed degree of first and second pixel patterns, varies in accordance with a relative positional deviation between the first and second pixel patterns, derived by comparison of when the relative positional deviation occurs with when no relative positional deviation occurs, wherein each of said first and second pixel patterns is a periodic pattern, and wherein a ratio of the number of pixels per period in which said first and second pixel patterns are not superposed on each other, is 0.25 or more when no relative positional deviation occurs.

7. An image recording system for deriving a recorded image by scanning on the basis of a recording signal produced from an image signal which is obtained from an image storage section, said system comprising:

a positional-deviation amount indicative signal producing section that produces a positional-deviation amount indicative signal representative of a positional deviation of a scanning line forming said recorded image;

a positional-deviation correcting section that corrects the positional deviation of said scanning line by controlling a pixel position to be taken from said image storage section so as to obtain a correction pixel position, and by causing said correction pixel position to correspond to a recording position of said scanning line, on the basis of the positional-deviation amount indicative signal; and a density-deviation correcting section that corrects a density deviation of said correction pixel position corresponding to a pixel pattern surrounding said correction pixel position as a center, wherein said surrounding pixel pattern is obtained from said image storage section.

8. An image recording system for deriving a recorded image by scanning on the basis of a recording signal produced from an image signal, said system comprising:

a positional-deviation amount indicative signal producing section that produces a positional-deviation amount indicative signal representative of a positional deviation of a scanning line forming said recorded image;

a positional-deviation correcting section that corrects the positional deviation of said scanning line on the basis of the positional-deviation amount indicative signal produced from said-deviation amount indicative signal producing section; and a density-deviation correcting section that corrects a density deviation of said recorded image due to the correction of the positional deviation by said positional-deviation correcting section, on the basis of a pixel pattern of said image signal, said system further comprising a first signal converting section that converts an inputted pulse-width modulation signal into a first image signal, wherein said positional-deviation correcting section corrects said positional deviation of said scanning line with respect to said first image signal to derive a second image signal, wherein said density-deviation correcting section corrects a positional deviation of said first or second image signal to derive a third image signal, and wherein said system further comprises a second signal converting section that converts said third image signal into a pulse-width modulation signal to derive a recording signal.

* * * * *